US00RE41303E

(19) United States
(12) Reissued Patent
Komatsu et al.

(10) Patent Number: US RE41,303 E
(45) Date of Reissued Patent: May 4, 2010

(54) LOAD DRIVER AND CONTROL METHOD FOR SAFELY DRIVING DC LOAD AND COMPUTER-READABLE RECORDING MEDIUM WITH PROGRAM RECORDED THEREON FOR ALLOWING COMPUTER TO EXECUTE THE CONTROL

(75) Inventors: Masayuki Komatsu, Aichi-Ken (JP); Ryoji Oki, Toyota (JP); Toshihiro Katsuda, Toyota (JP)

(73) Assignee: Toyota Jidosha Kabushiki Kaisha, Toyota (JP)

(21) Appl. No.: 11/398,751
(22) Filed: Apr. 6, 2006

Related U.S. Patent Documents

Reissue of:
(64) Patent No.: 6,917,179
Issued: Jul. 12, 2005
Appl. No.: 10/272,988
Filed: Oct. 18, 2002

(30) Foreign Application Priority Data

Oct. 25, 2001 (JP) ..... 2001-327994
Feb. 14, 2002 (JP) ..... 2002-036341

(51) Int. Cl.
*H02P 1/46* (2006.01)

(52) U.S. Cl. ..... 318/700; 318/798; 318/805; 318/434; 361/18; 361/20; 361/22; 361/23

(58) Field of Classification Search ..... 318/700, 318/798, 805, 434; 361/18, 20, 22, 23
See application file for complete search history.

(56) References Cited

U.S. PATENT DOCUMENTS

| | | | |
|---|---|---|---|
| 4,467,408 | A | 8/1984 | Matulevich et al. |
| 4,999,561 | A | 3/1991 | Kaga et al. |

(Continued)

FOREIGN PATENT DOCUMENTS

| | | | |
|---|---|---|---|
| CN | 1114476 | A | 1/1996 |
| EP | 0 825 059 | A2 | 2/1998 |
| EP | 1 219 493 | A1 | 7/2002 |
| EP | 1 286 459 | A1 | 2/2003 |
| JP | A 05130707 | | 5/1993 |
| JP | 6-255402 | | 9/1994 |
| JP | 9-46921 | | 2/1997 |
| JP | A-10-127050 | | 5/1998 |
| JP | A 10-136570 | | 5/1998 |
| JP | 10-191503 | | 7/1998 |
| JP | 11-4507 | | 1/1999 |
| JP | A-11-69882 | | 3/1999 |
| JP | A-11-299290 | | 10/1999 |
| JP | 11-332006 | | 11/1999 |
| JP | 2000-059919 | | 2/2000 |
| JP | A-2000-324891 | | 11/2000 |
| JP | A-2001-157487 | | 6/2001 |
| JP | A 2001-211507 | | 8/2001 |
| JP | 2001-268702 | | 9/2001 |
| JP | A 2001-275367 | | 10/2001 |
| WO | WO 01/21431 | | 3/2001 |

*Primary Examiner*—Bentsu Ro
*Assistant Examiner*—David S Luo
(74) *Attorney, Agent, or Firm*—Oliff & Berridge, PLC

(57) ABSTRACT

In regenerative braking mode, an inverter converts, according to PWMC signal from a control unit, an AC voltage generated by a motor into a DC voltage to supply the converted DC voltage to an up-converter which down-converts the DC voltage to charge a DC power supply. The control unit receives voltage V2 from a voltage sensor to stop the up-converter if voltage V2 is higher than a predetermined value. The control unit further receives voltage Vf from a voltage sensor that is applied to a DC/DC converter and stops the up-converter if voltage Vf is higher than a predetermined value. Moreover, the control unit receives voltage V1 of the DC power supply from a voltage sensor to stop the up-converter if voltage V1 does not match voltage V2.

52 Claims, 16 Drawing Sheets

U.S. PATENT DOCUMENTS 5,052,908 A 10/1991 Inaba et al.
5,089,766 A 2/1992 Iwatani
5,127,085 A 6/1992 Becker et al.
5,373,223 A 12/1994 Akagi et al.
5,796,175 A 8/1998 Itoh et al.
5,841,266 A 11/1998 Hikita et al.
6,114,775 A 9/2000 Chung et al.
6,384,567 B1 5/2002 Maeda
6,577,483 B1 * 6/2003 Steicher et al. ..... 361/90
6,583,519 B2 * 6/2003 Aberle et al. ..... 307/10.1
6,608,396 B2 8/2003 Downer et al.
6,639,385 B2 * 10/2003 Verbrugge et al. ..... 320/132
6,651,759 B1 * 11/2003 Gruenwald et al. ..... 180/65.2
6,653,745 B1 * 11/2003 Masaki et al. ..... 307/10.1
6,674,180 B2 1/2004 Gale et al.
6,686,718 B2 * 2/2004 Jadric et al. ..... 318/801
6,831,442 B2 12/2004 Hsu et al.
6,889,126 B2 5/2005 Komiyama et al.
6,907,948 B2 6/2005 Wakashiro et al.
6,920,948 B2 7/2005 Sugiura et al.
6,932,176 B2 8/2005 Takami et al.
2003/0057914 A1 3/2003 Kamatsu et al.
2003/0067278 A1 4/2003 Nakamura et al.
2004/0056616 A1 3/2004 Honda
2004/0145338 A1 7/2004 Nakamura et al.

* cited by examiner

LOAD DRIVER AND CONTROL METHOD FOR SAFELY DRIVING DC LOAD AND COMPUTER-READABLE RECORDING MEDIUM WITH PROGRAM RECORDED THEREON FOR ALLOWING COMPUTER TO EXECUTE THE CONTROL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a load driver for driving a DC load connected to a DC power supply. The present invention further relates to a control method for driving the DC load connected to the DC power supply. Moreover, the present invention relates to a computer-readable recording medium on which a program is recorded that allows a computer to execute the control for driving the DC load.

2. Description of the Background Art

Hybrid vehicles and electric vehicles are now attracting considerable attention as they help the environment. Some hybrid vehicles are now commercially available.

The hybrid vehicle includes, as its power source, a DC power supply, an inverter and a motor driven by the inverter in addition to a conventional engine. Specifically, the engine is driven to generate power while a DC voltage from the DC power supply is converted into AC voltage by the inverter to rotate the motor by the AC voltage and accordingly generate power. The power source of the electric vehicle is a DC power supply, an inverter and a motor driven by the inverter.

Such a hybrid vehicle or electric vehicle is designed for example to include a motor driver as shown in FIG. 16. Referring to FIG. 16, motor driver 600 includes a DC power supply B, system relays SR1 and SR2, a capacitor C, a bidirectional voltage converter 410, and an inverter 420. Bidirectional voltage converter 410 includes a reactor L, NPN transistors Q10 and Q11, and diodes D10 and D11. Reactor L has one end connected to a power supply line of DC power supply B and the other end connected to an intermediate point between NPN transistors Q10 and Q11, i.e., between the emitter of NPN transistor Q10 and the collector of NPN transistor Q11. NPN transistors Q10 and Q11 are connected in series between a power supply line and a ground line. NPN transistor Q10 has its collector connected to the power supply line of inverter 420 while NPN transistor Q11 has its emitter connected to the ground line. Between the emitter and collector of NPN transistors Q10 and Q11 each, corresponding one of diodes D10 and D11 is provided to flow current from the emitter to the collector.

DC power supply B supplies a DC voltage to capacitor C when system relays SR1 and SR2 are made on. Capacitor C smoothes the DC voltage from DC power supply B to supply the smoothed DC voltage to bidirectional voltage converter 410. Bidirectional voltage converter 410 is controlled by a control unit (not shown) to boost the DC voltage from capacitor C in response to a period during which NPN transistor Q11 is kept on. Converter 410 then supplies the boosted DC voltage to inverter 420. Bidirectional voltage converter 410 is also controlled by the control unit to down-convert a DC voltage converted by inverter 420 to charge DC power supply B in regenerative power generation by a motor M.

Inverter 420 receives the DC voltage from bidirectional voltage converter 410 via a smoothing capacitor (not shown) and converts the DC voltage into an AC voltage under control by a control unit (not shown) to drive motor M. Further, in regenerative power generation mode by motor M, inverter 420 receives an AC voltage from motor M and converts the AC voltage into a DC voltage under control by the control unit to supply the DC voltage to bidirectional voltage converter 410. Motor M is driven by inverter 420 to generate predetermined torque. In addition, motor M serves as a regenerative generator to supply the generated AC voltage to inverter 420.

DC/DC converter 430 is located between bidirectional voltage converter 410 and DC power supply B to be connected to DC power supply B and receives the DC voltage from DC power supply B. DC/DC converter 430 is used for auxiliary equipment of the vehicle and down-converts the DC voltage from DC power supply B and supplies the down-converted DC voltage to an inverter (not shown) driving an air conditioner (not shown) provided in the hybrid or electric vehicle.

In motor driver 600, DC power supply B supplies the DC voltage to capacitor C when system relays SR1 and SR2 are made on, and then capacitor C smoothes the DC voltage to supply the smoothed voltage to bidirectional voltage converter 410 and DC/DC converter 430. Bidirectional voltage converter 410 boosts the DC voltage in response to a period during which NPN transistor Q11 is kept on and supplies the boosted DC voltage to inverter 420 via the smoothing capacitor (not shown). Inverter 420 converts the DC voltage into the AC voltage to drive motor M. Motor M generates predetermined torque. On the other hand, DC/DC converter 430 down-converts the DC voltage from capacitor C to supply the down-converted voltage to the inverter which drives the air conditioner.

In regenerative braking of the hybrid or electric vehicle, motor M generates the AC voltage to be supplied to inverter 420. Inverter 420 converts the AC voltage from motor M into the DC voltage to be supplied to bidirectional voltage converter 410. Bidirectional voltage converter 410 down-converts the DC voltage from inverter 420 to charge DC power supply B. In this way, motor driver 600 boosts the DC voltage from DC power supply B to drive motor M, and motor driver 600 also charges DC power supply B with the voltage generated by motor M in regenerative braking.

Alternatively, a hybrid or electric vehicle is designed to include a motor driver as shown in FIG. 17. Referring to FIG. 17, motor driver 700 has the same configuration as that of motor driver 600 except that a DC/DC converter 440 of motor driver 700 is connected to the output of bidirectional voltage converter 410.

DC/DC converter 440 receives a voltage which is boosted by bidirectional voltage converter 410 and down-converts the boosted voltage to charge an auxiliary buttery 450 (with output voltage of 12 V for example) which supplies electric power to such a control circuit as an ECU (Electrical Control Unit). Regarding the configuration as shown in FIG. 17, even if any abnormal event of DC power supply B, fuse blowing or any abnormal event of system relays SR1 and SR2 for example occurs, DC/DC converter 440 is supplied with a DC voltage generated by motor M1 and converted by inverter 420. In other words, even if any abnormal event occurs in the circuitry between bidirectional voltage converter 410 and DC power supply B, auxiliary battery 450 for driving such a control circuit as ECU never becomes empty and thus the vehicle is prevented from being unable to move.

As for the conventional motor driver 600 in regenerative power generation, if DC power supply B is separated due to malfunction of system relays SR1 and SR2 or break, a voltage Vb appearing on the DC power supply B side of bidirectional voltage converter 410 increases resulting in a problem that an overvoltage is applied to DC/DC converter 430 which is a DC load.

In order to protect DC load system from the overvoltage, the withstand voltage of the DC load system should be enhanced which requires components with a high withstand voltage. Then, the overall cost cannot be reduced. Therefore, it is necessary to prevent the overvoltage from being applied to the DC load system in regenerative power generation if the DC power supply B is separated due to any reason.

As for the conventional motor driver 700, DC/DC converter 440 is connected to the output of bidirectional voltage converter 410. Then, a high withstand voltage is required and accordingly, the requirements of the specification of components are considerably severe. A resultant problem is that the configuration of the circuitry becomes complicated which leads to difficulty in reduction of the cost and size.

SUMMARY OF THE INVENTION

One object of the present invention is thus to provide a load driver that safely drives a DC load connected to a DC power supply.

Another object of the present invention is to provide a control method for safely driving a DC load connected to a DC power supply.

Still another object of the present invention is to provide a computer-readable recording medium on which a program is recorded for allowing a computer to execute control for safely driving a DC load connected to a DC power supply.

According to the present invention, a load driver includes a DC power supply, a voltage converter, a DC load, and a control unit.

The DC power supply outputs a DC voltage. The voltage converter is connected to the DC power supply to provide, toward the DC power supply, a DC voltage based on electric power generated by a power-generating unit. The DC load is connected in parallel with the voltage converter to the DC power supply. The control unit executes at least one of first control and second control when a malfunction is detected in an electrical system between the DC power supply and the voltage converter, the first control being executed to protect an electrical system of the DC load and the second control being executed to continue operation of the DC load.

Preferably, the control unit executes the first control to protect the electrical system of the DC load when the malfunction is detected in the electrical system between the DC power supply and the voltage converter.

Preferably, when the malfunction is detected in the electrical system between the DC power supply and the voltage converter, the control unit controls the voltage converter to apply a voltage smaller than a predetermined value to the electrical system of the DC load.

Preferably, the load driver further includes a voltage sensor detecting a voltage applied to the DC load. The control unit stops operation of the voltage converter when the voltage detected by the voltage sensor reaches at least the predetermined value.

Preferably, the load driver further includes a voltage sensor. The voltage sensor detects a DC voltage on an input of the voltage converter when a DC current is supplied from the DC power supply to the voltage converter. The control unit stops operation of the voltage converter when the DC voltage detected by the voltage sensor reaches at least the predetermined value.

Preferably, the power-generating unit is formed of at least one generator.

Preferably, each of at least one generators is an AC generator, and the load driver further includes at least one inverters provided correspondingly to that at least one generators and each converting an AC voltage supplied from the corresponding AC generator into a DC voltage. The control unit controls each of at least one inverters in a normal operation to convert the AC voltage into the DC voltage and supply the DC voltage converted from the AC voltage to the voltage converter.

Preferably, the load driver further includes a first voltage sensor and a second voltage sensor. The first voltage sensor detects a first DC voltage output from the DC power supply. The second voltage sensor detects a second DC voltage on an input of the voltage converter when a DC current is supplied from the DC power supply to the voltage converter. The control unit stops operation of the voltage converter when the first voltage detected by the first voltage sensor differs from the second voltage detected by the second voltage sensor.

Preferably, the power-generating unit is formed of at least one generator.

Preferably, the generator is an AC generator, and the load driver further includes an inverter converting an AC voltage supplied from the AC generator into a DC voltage. The control unit controls the inverter in a normal operation to convert the AC voltage into the DC voltage and supply the DC voltage converted from the AC voltage to the voltage converter.

Preferably, the power-generating unit is formed of a plurality of generators.

Preferably, the control unit further controls a plurality of drivers corresponding respectively to those generators to keep a balance between supply and consumption of electric energy with respect to those generators, and controls the electrical system of the DC load to drive the DC load by electric power supplied from the DC power supply.

Preferably, those generators are each an AC generator. The load driver further includes a plurality of inverters provided correspondingly to those generators and each converting an AC voltage supplied from a corresponding AC generator into a DC voltage. The control unit controls each of the inverters in a normal operation to convert the AC voltage into the DC voltage and supply the DC voltage converted from the AC voltage to the voltage converter.

Preferably, the generator is a drive motor generating drive power for a vehicle.

Preferably, the load driver further includes first and second voltage sensors. The first voltage sensor detects a first DC voltage output from the DC power supply and the second voltage sensor detects a second DC voltage on an input of the voltage converter when a DC current is supplied from the DC power supply to the voltage converter. The control unit executes the second control when the first voltage detected by the first voltage sensor differs from the second voltage detected by the second voltage sensor.

Preferably, the control unit executes control for supplying a DC voltage based on electric power generated by the power-generating unit to the DC load.

Preferably, the control unit controls the voltage converter for directly supplying to the DC load a DC voltage based on the electric power generated by the power-generating unit and having a voltage level lower than a predetermined value.

Preferably, the voltage converter includes first and second switching elements and a reactor. The first and second switching elements are connected in series between terminals receiving the DC voltage, switching of at least one of the switching elements being controlled in voltage-up-converting operation and voltage-down-converting operation. The reactor has one end connected to a point of connection between the first switching element and the second switching element. The reactor and the second switching element are connected in series between terminals of the DC power supply. The control unit keeps the first switching element continuously in a conducting state and keeps the second switching element continuously in a disconnected state.

Preferably, the load driver further includes a supply unit and a switching unit. The supply unit directly supplies to the DC load a DC voltage based on the electric power generated by the power-generating unit and having a voltage level lower than a predetermined value. The switching unit switches supply of the DC voltage between the voltage converter and the supply unit. The control unit controls the switching unit to supply the DC voltage to the supply unit.

According to the present invention, a control method for safely driving a DC load connected to a DC power supply includes a first step of detecting a malfunction in an electrical system between the DC power supply and a voltage converter converting voltage, and a second step of executing at least one of first control and second control when the malfunction is detected, the first control being executed to protect an electrical system of the DC load connected in parallel with the voltage converter to the DC power supply and the second control being executed to continue operation of the DC load.

Preferably, the first control is executed in the second step to protect the electrical system of the DC load connected in parallel with the voltage converter to the DC power supply.

Preferably, the first step includes a first sub step of detecting a voltage applied to the DC load and a second sub step of detecting whether or not the detected voltage is equal to or more than a predetermined value. In the second step, operation of the voltage converter is stopped when the detected voltage is equal to or more than the predetermined value.

Preferably, the first step includes a first sub step of detecting a DC voltage on an input of the voltage converter when a DC current is supplied from the DC power supply to the voltage converter and a second sub step of detecting whether or not the detected voltage is equal to more than a predetermined value. In the second step, operation of the voltage converter is stopped when the detected voltage is equal to or more than the predetermined value.

Preferably, the first step includes a first sub step of detecting a first voltage output from the DC power supply, a second sub step of detecting a second DC voltage on an input of the voltage converter when a DC current is supplied from the DC power supply to the voltage converter, and third sub step of detecting whether or not the first voltage detected in the first sub step matches the second voltage detected in the second sub step. In the second step, operation of the voltage converter is stopped when the first voltage does not match the second voltage.

Preferably, the voltage converter is connected to a plurality of inverters provided correspondingly to a plurality of power-generating units. The control method further includes a third step of controlling those inverters to maintain a balance between supply and consumption of electric energy with respect to those power-generating units, and a fourth step of controlling the electrical system of the DC load to drive the DC load by electric power supplied from the DC power supply.

Preferably, the first step includes a first sub step of detecting a first voltage output from the DC power supply, a second sub step of detecting a second DC voltage on an input of the voltage converter when a DC current is supplied from the DC power supply to the voltage converter and a third sub step of detecting whether or not the first voltage detected in the first sub step matches the second voltage detected in the second sub step. In the second step, the second control is executed when the first voltage does not match the second voltage.

Preferably, in the second step, control is executed to supply, to the DC load, DC power based on electric power generated by a power-generating unit.

Preferably, in the second step, the voltage converter is controlled to directly supply, to the DC load, a DC voltage based on the electric power generated by the power-generating unit and having a voltage level lower than a predetermined value.

Preferably, the voltage converter includes first and second switching elements and a reactor. The first and second switching elements are connected in series between terminals receiving the DC voltage, switching of at least one of the switching elements being controlled in voltage-up-converting operation and voltage-down-converting operation. The reactor has one end connected to a point of connection between the first switching element and the second switching element. The reactor and the second switching element are connected in series between terminals of the DC power supply.

Here, the second step of the control method includes a fourth sub step of keeping the first switching element continuously in a conducting state and a fifth sub step of keeping the second switching element continuously in a disconnected state.

Preferably, the DC load is connected to a supply unit and the voltage converter, the supply unit supplying, toward the DC power supply, a DC voltage based on the electric power generated by the power-generating unit. The supply unit and the voltage converter are connected to a switching unit switching supply of the DC voltage between the supply unit and the voltage converter. In the second step of the control method, the switching unit is controlled to supply, to the supply unit, a DC voltage based on the electric power generated by the power-generating unit and having a voltage level lower than a predetermined value.

According to the present invention, a computer-readable recording medium has a program recorded thereon to allow a computer to execute control for safely driving a DC load connected to a DC power supply. The computer executes a first step of detecting a malfunction in an electrical system between the DC power supply and a voltage converter converting voltage, and a second step of executing at least one of first control and second control when the malfunction is detected, the first control being executed to protect an electrical system of the DC load connected in parallel with the voltage converter to the DC power supply and the second control being executed to continue operation of the DC load.

Preferably, the first control is executed in the second step to protect the electrical system of the DC load connected in parallel with the voltage converter to the DC power supply.

Preferably, the first step includes a first sub step of detecting a voltage applied to the DC load and a second sub step of detecting whether or not the detected voltage is euqal to or more than a predetermined value. In the second step, operation of the voltage converter is stopped when the detected voltage is equal to or more than the predetermined value.

Preferably, the first step includes a first sub step of detecting a DC voltage on an input of the voltage converter when a DC current is supplied from the DC power supply to the voltage converter and a second subs step of detecting whether or not the detected voltage is equal to or more than a predetermined value. In the second step, operation of the voltage converter is stopped when the detected voltage is equal to or more than the predetermined value.

Preferably, the first step includes a first sub step of detecting a first voltage output from the DC power supply, a second sub step of detecting a second DC voltage on an input of the voltage converter when a DC current is supplied from the DC power supply to the voltage converter, and a third sub step of detecting whether or not the first voltage detected in the first sub step matches the second voltage detected in the second sub step. In the second step, operation of the voltage converter is stopped when the first voltage does not match the second voltage.

Preferably, the voltage converter is connected to a plurality of inverters provided correspondingly to a plurality of power-generating units. The program allows the computer to further execute a third step of controlling those inverters to maintain a balance between supply and consumption of electric energy with respect to those power-generating units, and a fourth step of controlling the electrical system of the DC load to drive the DC load by electric power supplied from the DC power supply.

Preferably, the first step includes a first sub step of detecting a first voltage output from the DC power supply, a second sub step of detecting a second DC voltage on an input of the voltage converter when a DC current is supplied from the DC power supply to the voltage converter, and a third sub step of detecting whether or not the first voltage detected in the first sub step matches the second voltage detected in the second sub step. In the second step, the second control is executed when the first voltage does not match the second voltage.

Preferably, in the second step, control is executed to supply, to the DC load, DC power based on electric power generated by a power-generating unit.

Preferably, in the second step, the voltage converter is controlled to directly supply, to the DC load, a DC voltage based on the electric power generated by the power-generating unit and having a voltage level lower than a predetermined value.

Preferably, the voltage converter includes first and second switching elements and a reactor. The first and second switching elements are connected in series between terminals receiving the DC voltage, switching of at least one of the switching elements being controlled in voltage-up-converting operation and voltage-down-converting operation. The reactor has one end connected to a point of connection between the first switching element and the second switching element. The reactor and the second switching element are connected in series between terminals of the DC power supply.

Here, the second step of the program includes a fourth sub step of keeping the first switching element continuously in a conducting state and a fifth sub step of keeping the second switching element continuously in a disconnected state.

Preferably, the DC load is connected to a supply unit and the voltage converter, the supply unit supplying, toward the DC power supply, a DC voltage based on the electric power generated by the power-generating unit. The supply unit and the voltage converter are connected to a switching unit switching supply of the DC voltage between the supply unit and the voltage converter.

Here, in the second step of the program, the switching unit is controlled to supply, to the supply unit, a DC voltage based on the electric power generated by the power-generating unit and having a voltage level lower than a predetermined value.

In this way, according to the present invention, the DC load connected between the DC power supply and the voltage converter is safely driven.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
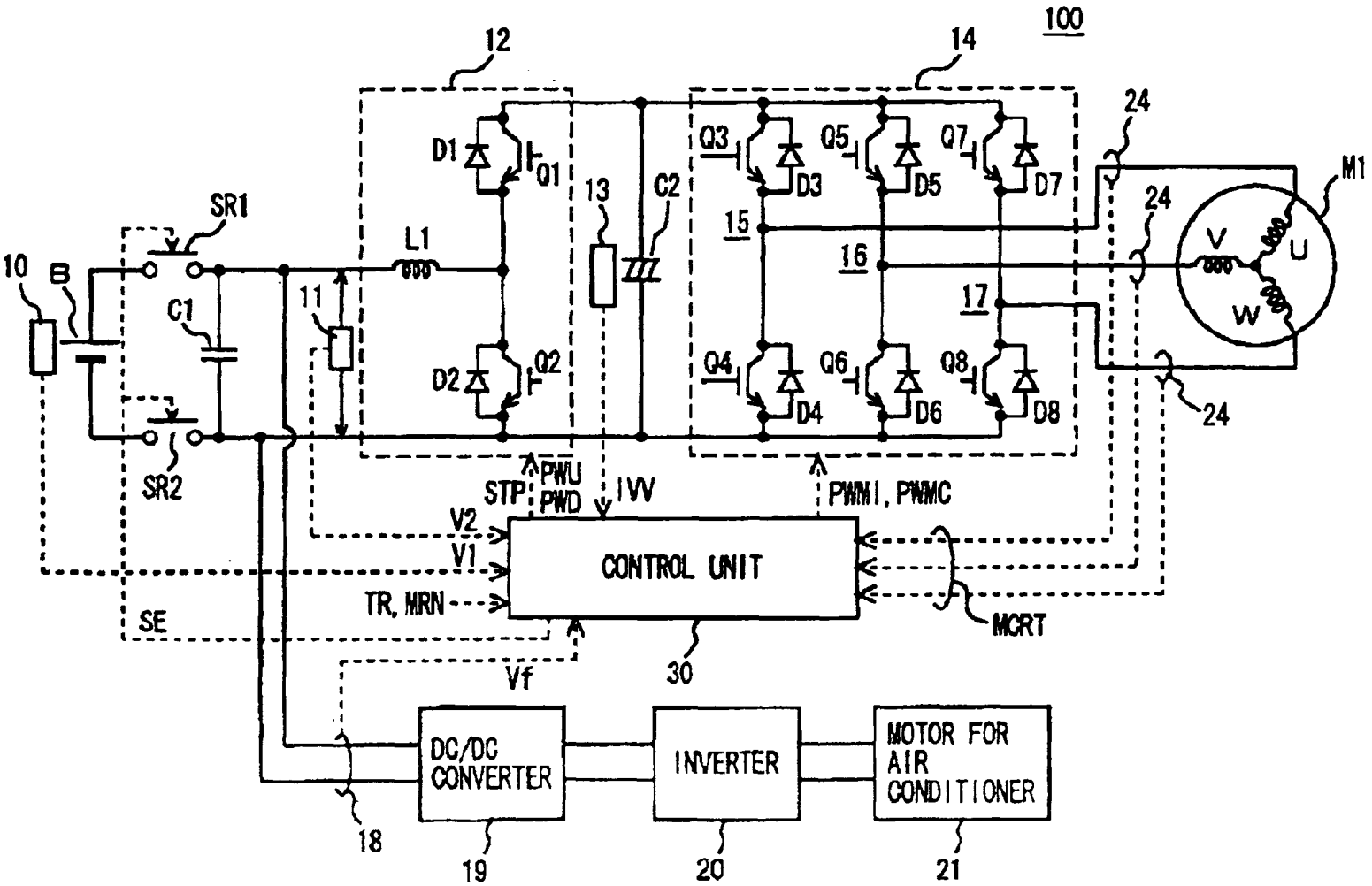
FIG. 1 is a block diagram schematically showing a motor driver according to a first embodiment.

Embodiments of the present invention are hereinafter described in detail in conjunction with the drawings. It is noted that the same or corresponding components in the drawings are denoted by the same reference character and description thereof is not repeated here.

First Embodiment

Referring to FIG. 1, a motor driver 100 having a load driver according to a first embodiment of the present invention includes a DC power supply B, voltage sensors 10, 11, 13 and 18, system relays SR1 and SR2, capacitors C1 and C2, an up-converter 12, an inverter 14, a current sensor 24, and a control unit 30. Motor driver 100 drives one motor M1. Motor M1 is a drive motor generating torque for driving drive wheels of a hybrid or electric vehicle. This motor serves as a power generator driven by an engine as well as an electric motor for the engine. Alternatively, the motor may be capable of starting the engine and incorporated as such into a hybrid vehicle.

Up-converter 12 includes a reactor L1, NPN transistors Q1 and Q2 and diodes D1 and D2. Reactor L1 has one end connected to a power supply line of DC power supply B and the other end connected to the intermediate point between NPN transistors Q1 and Q2, i.e., between the emitter of NPN transistor Q1 and the collector of NPN transistor Q2.

NPN transistors Q1 and Q2 are connected in series between a power supply line of inverter 14 and a ground line. The collector of NPN transistor Q1 is connected to the power supply line and the emitter of NPN transistor Q2 is connected to the ground line. Between the collector and emitter of NPN transistors Q1 and Q2 each, corresponding one of diodes D1 and D2 is connected for flowing current from the emitter to the collector.

Inverter 14 is constituted of U-phase arm 15, a V-phase arm 16 and a W-phase arm 17. U-phase arm 15, V-phase arm 16 and W-phase arm 17 are connected in parallel between the power supply line and the ground.

U-phase arm 15 is constituted of series-connected NPN transistors Q3 and Q4, V-phase arm 16 is constituted of series-connected NPN transistors Q5 and Q6, and W-phase arm 17 is constituted of series-connected NPN transistors Q7 and Q8. Diodes D3 to D8 are each connected between the collector and emitter of a corresponding one of NPN transistors Q3–Q8 for allowing current to flow from the emitter to the collector.

The U, V and W-phase arms have respective intermediate points connected to respective ends of phase coils of motor M1. Motor M1 is a three-phase permanent-magnet motor with respective three coils of U, V and W phases each having one end connected commonly to the center. The other end of the U-phase coil is connected to the intermediate point between NPN transistors Q3 and Q4, the other end of the V-phase coil is connected to the intermediate point between NPN transistors Q5 and Q6, and the other end of the W-phase coil is connected to the intermediate point between NPN transistors Q7 and Q8.

DC power supply B is formed of a nickel-hydrogen or lithium-ion secondary battery. DC power supply B outputs a DC voltage of 200–300 V for example. Voltage sensor 10 detects a voltage V1 from DC power supply B to output the detected voltage V1 to control unit 30. System relays SR1 and SR2 are made on by a signal SE from control unit 30.

Capacitor C1 smoothes a DC voltage supplied from DC power supply B to provide the smoothed DC voltage to up-converter 12 and a DC/DC converter 19. Voltage sensor 11 detects a voltage V2 on the input side of up-converter 12 to output the detected voltage V2 to control unit 30.

Up-converter 12 boosts the DC voltage from capacitor C1 to supply the boosted voltage to capacitor C2. More specifically, up-converter 12 receives a signal PWU from control unit 30 to boost and supply the DC voltage to capacitor C2 in response to a period in which NPN transistor Q2 is made on by signal PWU. In this case, NPN transistor Q1 is turned off by signal PWU. Further, up-converter 12 receives a signal PWD from control unit 30 to down-convert a DC voltage supplied from inverter 14 via capacitor C2 and accordingly charge DC power supply B. In addition, up-converter 12 receives a signal STP from control unit 30 to stop operating.

Capacitor C2 smoothes the DC voltage from up-converter 12 to supply the smoothed DC voltage to inverter 14. Voltage sensor 13 detects the voltage on both ends of capacitor C2, i.e., voltage IVV to be supplied to inverter 14 and outputs the detected input voltage IVV to control unit 30.

Inverter 14 receives the DC voltage from capacitor C2 to convert, according to a signal PWM1 from control unit 30, the DC voltage into an AC voltage and accordingly drive motor M1. Then, motor M1 is driven to generate torque designated by a torque control value TR. In regenerative braking of a hybrid or electric vehicle including motor driver 100, inverter 14 converts an AC voltage generated by motor M1 into a DC voltage according to a signal PWMC from control unit 30 and supplies the converted voltage to up-converter 12 via capacitor C2.

Here, "regenerative braking" includes braking which is caused when a driver (operator) of a hybrid or electric vehicle manages the foot brake and which is accompanied by regenerative power generation as well as deceleration (or stopping of acceleration) of the vehicle by releasing the accelerator (pedal) in driving without managing the foot brake, which is also accompanied by regenerative power generation.

Voltage sensor 18 detects a voltage Vf applied from DC power supply B to DC/DC converter 19 to output the detected voltage Vf to control unit 30.

Current sensor 24 detects a motor current MCRT flowing to motor M1 to output the detected motor current MCRT to control unit 30.

Control unit 30 generates, based on torque control value TR and motor rotation number MRN supplied from an externally placed ECU (electrical control unit), voltage V1 from voltage sensor 10, input voltage IVV from voltage sensor 13 and motor current MCRT from current sensor 24, signal PWU for driving up-converter 12 and signal PWM1 for driving inverter 14 following a method as described hereinbelow, and provides the signals PWU and PWM1 to up-converter 12 and inverter 14 respectively.

Control unit 30 receives from the external ECU a signal indicating that the hybrid or electric vehicle enters a regenerative braking mode to generate signal PWMC for converting an AC voltage generated by motor M1 into a DC voltage and output the signal to inverter 14. In this case, switching of NPN transistors Q4, Q6 and Q8 of inverter 14 is controlled by signal PWMC. Specifically, NPN transistors Q6 and Q8 are turned on when electric power is generated by the U phase of motor M1, NPN transistors Q4 and Q8 are turned on when the electric power is generated by the V phase thereof, and NPN transistors Q4 and Q6 are turned on when the electric power is generated by the W phase thereof. In this way, inverter 14 converts the AC voltage generated by motor M1 into the DC voltage to supply the DC voltage to up-converter 12.

Moreover, control unit 30 receives voltage V2 from voltage sensor 11 (or voltage Vf from voltage sensor 18) to determine whether or not the received voltage V2 (or Vf) is higher than a predetermined value. When control unit 30 determines that voltage V2 (or Vf) is higher than the predetermined value, control unit 30 accordingly determines that an overvoltage is applied to the input of up-converter 12 to generate signal STP for stopping up-converter 12 and supply signal STP to up-converter 12.

In this case, control unit 30 may determine whether or not voltage V1 from voltage sensor 10 matches voltage V2 from voltage sensor 11 and generates signal STP to output the signal STP to up-converter 12 when voltage V1 does not match voltage V2. The fact that voltage V1 does not match voltage V2 means that DC power supply B is separated from capacitor C1, up-converter 12 and DC/DC converter 19 due to any malfunction of system relays SR1 and SR2 or break.

It is seen from the above that the first embodiment is characterized in that up-converter 12 is stopped when voltage V2 applied to the input to up-converter 12 (or voltage Vf applied to DC/DC converter 19) is an overvoltage or DC power supply B is separated due to any reason.

Moreover, control unit 30 generates signal SE for allowing system relays SR1 and SR2 to be made on to supply signal SE to relays SR1 and SR2.

DC/DC converter 19 down-converts the DC voltage from DC power supply B to provide the down-converted voltage to an inverter 20. Inverter 20 converts the DC voltage from DC/DC converter 19 into an AC voltage for driving a motor 21 used for an air conditioner. Air-conditioner motor 21 drives the compressor of the air conditioner.

DC/DC converter 19, inverter 20 and air-conditioner motor 21 constitute auxiliary equipment provided to the hybrid or electric vehicle. In addition, DC/DC converter 19 constitutes a DC load provided to the auxiliary equipment.

As for motor driver 100, capacitor C2 is driven with approximately 500 V at the maximum, and accordingly the electrical system of capacitor C2 and inverter 14 provided on the output side of up-converter 12 is constituted of components having an withstand voltage in the range from 750 V to 900 V.

On the other hand, the auxiliary equipment-related circuitry including DC/DC converter 19, inverter 20 and air-conditioner motor 21 is constituted of components having a withstand voltage of approximately 400 V.

Figure 2:
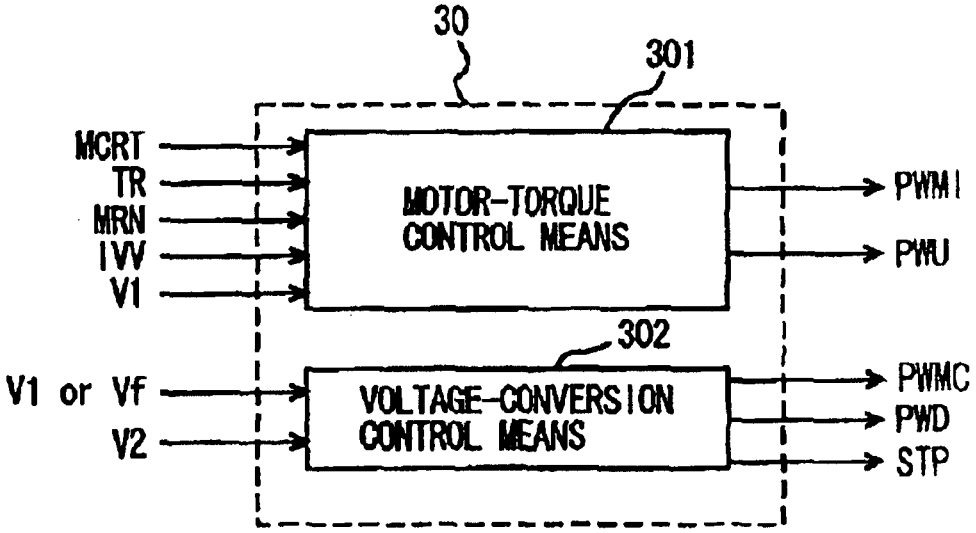
FIG. 2 is a functional block diagram of a control unit shown in FIG. 1.

FIG. 2 is a functional block diagram of control unit 30. Referring to FIG. 2, control unit 30 includes motor-torque control means 301 and voltage-conversion control means 302. Motor-torque control means 301 generates, based on torque control value TR, output voltage V1 of DC power supply B, motor current MCRT, motor rotation number MRN and inverter input voltage IVV, signal PWU for turning on/off NPN transistors Q1 and Q2 of up-converter 12 and signal PWM1 for turning on/off NPN transistors Q3–Q8 of inverter 14, when motor M1 is driven, following a method as described hereinbelow, and provides the generated signals PWU and PWM1 respectively to up-converter 12 and inverter 14.

Voltage-conversion control means 302 receives voltage V2 from voltage sensor 11 (or voltage Vf from voltage sensor 18) to generate signal STP for stopping up-converter 12 if voltage V2 (or Vf) is higher than a predetermined value and provide the signal STP to up-converter 12. Further voltage-conversion control means 302 receives voltage V1 from voltage sensor 10 to generate signal STP if voltage V1 differs from voltage V2 and provide the signal STP to up-converter 12. Moreover, in regenerative braking, voltage-conversion control means 302 generates a signal PWD for down-converting the DC voltage supplied from inverter 14 to output the signal PWD to up-converter 12. Up-converter 12 thus serves as a bidirectional converter since converter 12 can also down-convert or reduce the voltage by signal PWD for down-converting the DC voltage. In addition, voltage-conversion control means 302 generates signal PWMC for converting the AC voltage generated by motor M1 into DC voltage to supply the signal PWMC to inverter 14.

Figure 3:
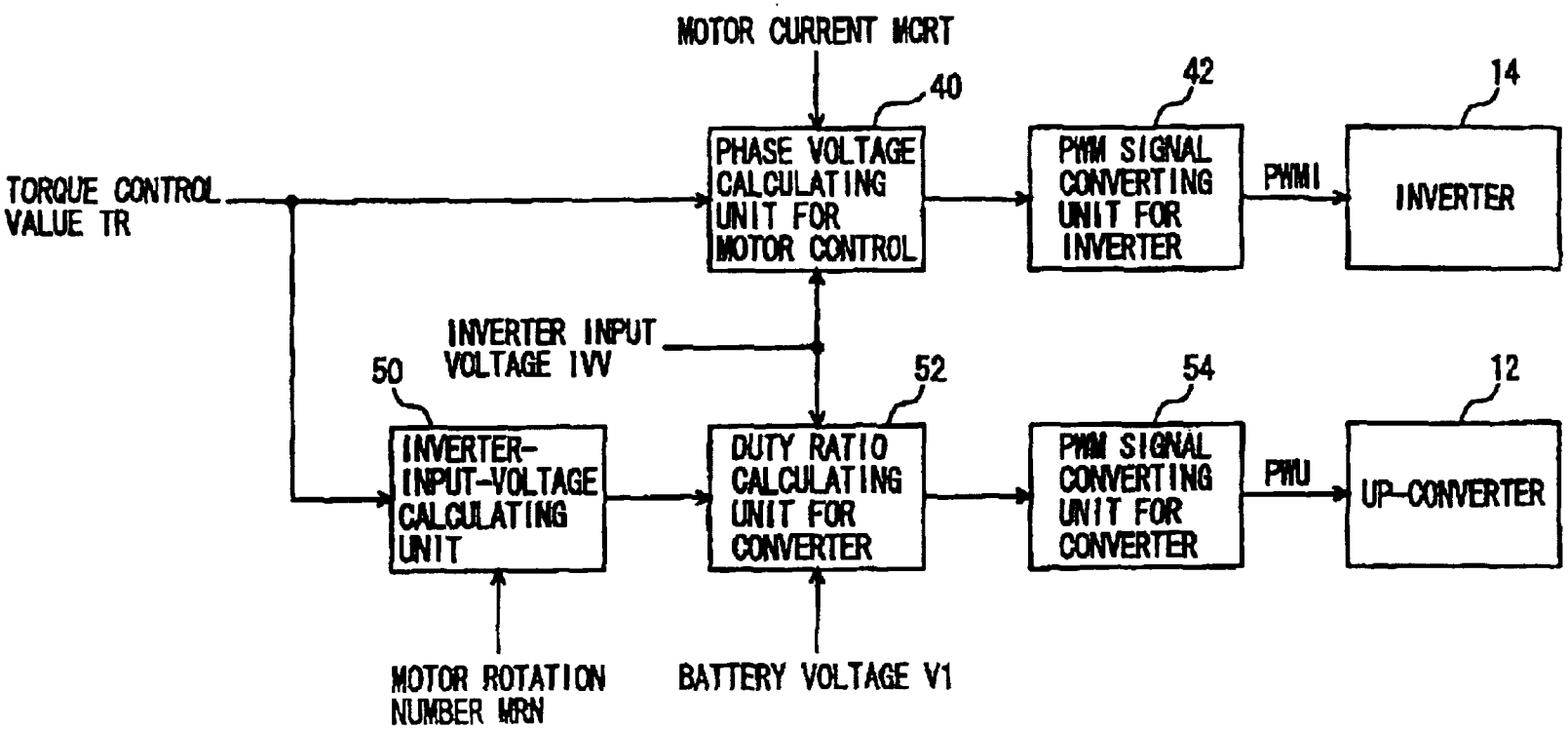
FIG. 3 is a functional block diagram illustrating the function of motor torque control means shown in FIG. 2.

FIG. 3 is a functional block diagram of motor-torque control means 301. Referring to FIG. 3, motor-torque control means 301 includes a phase voltage calculating unit 40 for controlling the motor, a PWM signal converting unit 42 for the inverter, an inverter-input-voltage calculating unit 50, a duty ratio calculating unit 52 for the converter, and a PWM signal converting unit 54 for the converter.

Phase voltage calculating unit 40 receives, from voltage sensor 13, input voltage IVV to inverter 14, receives, from current sensor 24, motor current MCRT flowing to each phase of motor M1, and receives torque control value TR from the external ECU. Based on the supplied signal, current and voltage, phase voltage calculating unit 40 calculates a voltage to be applied to the coil of each phase of motor M1 and supplies the calculated voltage to PWM signal converting unit 42. Then, based on the calculated voltage supplied from phase voltage calculating unit 40, PWM signal converting unit 42 generates signal PWM1 for actually turning on/off each of NPN transistors Q3–Q8 of inverter 14 and supplies the generated signal PWM1 to each of NPN transistors Q3–Q8 of inverter 14.

Switching of NPN transistors Q3–Q8 each is thus controlled and NPN transistors Q3–Q8 accordingly control the current to be supplied to each phase of motor M1 so that motor M1 generates any designated torque. The motor drive current is controlled in this way to output the motor torque according to torque control value TR.

On the other hand, inverter-input-voltage calculating unit 50 calculates an optimum value (target value) of an inverter input voltage based on torque control value TR and motor rotation number MRN and provides the calculated optimum value to duty ratio calculating unit 52. Duty ratio calculating unit 52 calculates, based on the optimum value of the inverter input voltage from inverter-input-voltage calculating unit 50, inverter input voltage IVV from voltage sensor 13 and voltage V1 from voltage sensor 10, a duty ratio for setting inverter input voltage IVV from voltage sensor 13 at the optimum value of the inverter input voltage supplied from inverter-input-voltage calculating unit 50, and provides the calculated duty ratio to PWM signal converting unit 54. Based on the duty ratio supplied from duty ratio calculating unit 52, PWM signal converting unit 54 generates signal PWU for turning on/off each of NPN transistors Q1 and Q2 of up-converter 12 and provides the generated signal PWU to NPN transistors Q1 and Q2 of up-converter 12.

A greater amount of electric power is accumulated by reactor L1 by increasing on-duty of NPN transistor Q2 which is the lower transistor of up-converter 12, and accordingly a higher-voltage output is obtained. The voltage on the power supply line of inverter 14 is decreased by increasing the on-duty of the upper transistor, i.e., NPN transistor Q1. The duty ratio of NPN transistors Q1 and Q2 can thus be controlled to control the voltage on the power supply line such that the voltage on the power supply line is an arbitrary voltage of at least the output voltage of DC power supply B.

Motor-torque control means 301 of control unit 30 thus controls up-converter 12 and inverter 14 for allowing motor M1 to generate torque according to torque control value TR supplied from the external ECU. Motor M1 accordingly generates the torque designated by torque control value TR.

Figure 4:
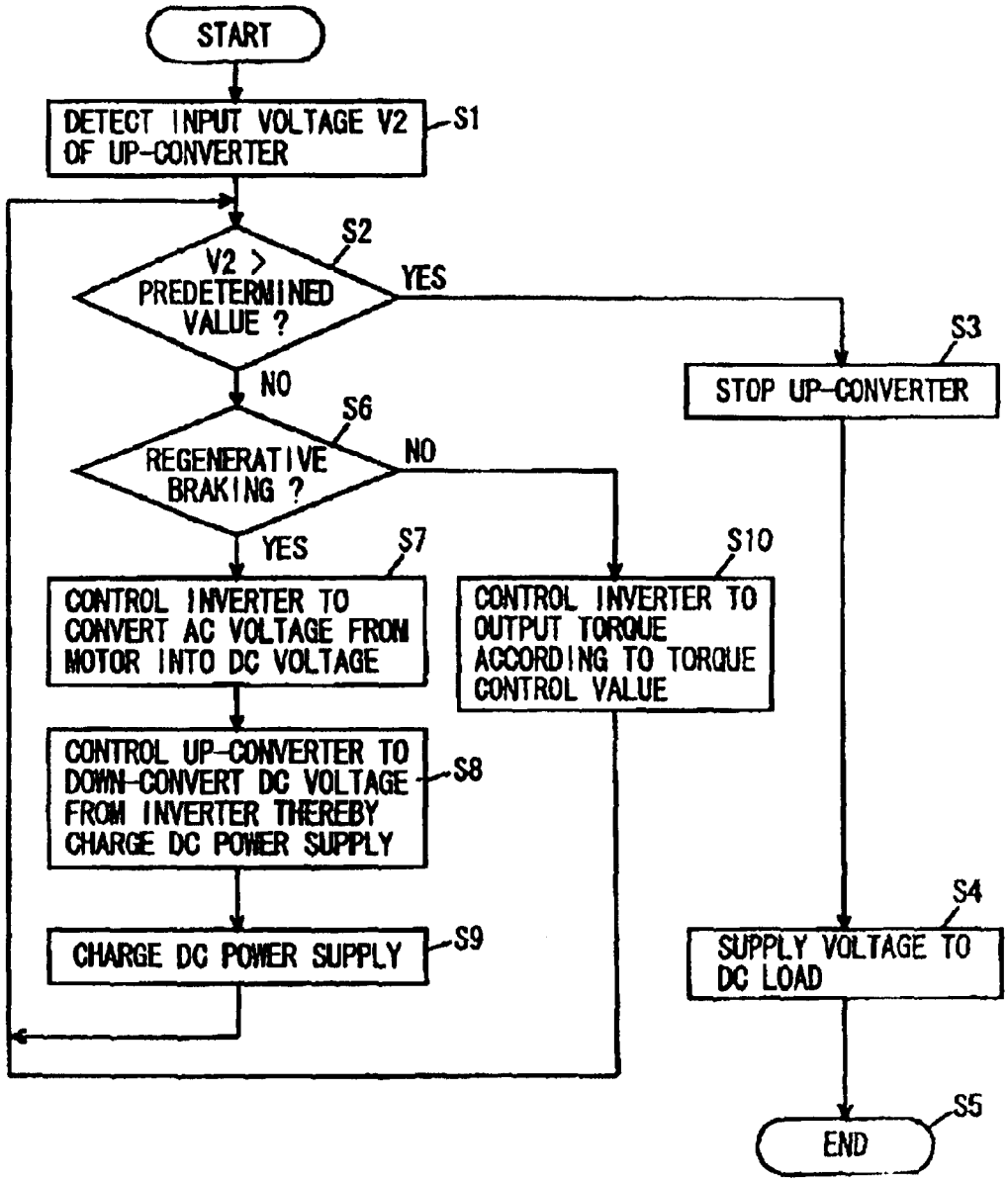
FIG. 4 is a flowchart illustrating an operation of the motor driver shown in FIG. 1.

Referring to FIG. 4, motor driver 100 operates as described below. The operation is started and voltage sensor 11 detects input voltage V2 to up-converter 12 (step S1) to output the detected voltage V2 to control unit 30. Voltage-conversion control means 302 of control unit 30 receives voltage V2 from voltage sensor 11 to determine whether or not the received voltage V2 is higher than a predetermined value (step S2).

This predetermined value is determined according to a formula: predetermined value=V0+$\alpha$, where V0 represents a voltage which is output from DC power supply B, and $\alpha$ is determined in such a way that the sum of V0 and $\alpha$ is a voltage which is impossible to be output from DC power supply B. In other words, the predetermined value is set at a certain voltage which is never output from DC power supply B. Then, if the voltage output from DC power supply B varies, to the maximum value of the varying output voltage, $\alpha$ is added to determine the predetermined value.

In step S2, if it is determined that voltage V2 is higher than the predetermined value, voltage-conversion control means 302 generates signal STP for stopping up-converter 12 and provides that signal to NPN transistors Q1 and Q2 of up-converter 12. Accordingly, NPN transistors Q1 and Q2 are stopped by signal STP and thus up-converter 12 is stopped (step S3). This is because voltage-conversion control means 302 judges, from the fact that voltage V2 is higher than the predetermined voltage, that an overvoltage is applied to the input of up-converter 12, and then stops up-converter 12 in order to prevent the overvoltage equal to or higher than the withstand voltage from being applied to capacitor C1 and DC/DC converter 19.

Up-converter 12 is thus stopped and then a DC voltage is supplied from DC power supply B to DC/DC converter 19 via capacitor C1 (step S4). DC/DC converter 19 down-converts the supplied DC voltage and provides the resultant voltage to inverter 20 which converts the DC voltage into an AC voltage for driving motor 21 for the air conditioner.

As described above, when it is determined that an overvoltage is applied to the input of up-converter 12, up-converter 12 is stopped from operating to eliminate the cause for the overvoltage and accordingly continue driving of the auxiliary equipment constituted of DC/DC converter 19, inverter 20 and air-conditioner motor 21. The series of steps of the operation are completed in this way (step S5).

In step S2, if voltage V2 is equal to or lower than the predetermined value, voltage-conversion control means 302 receives, from the external ECU, a signal KR indicating whether or not the hybrid or electric vehicle is in the regenerative braking mode. Based on this signal KR, it is determined that whether the vehicle is in the regenerative braking mode (step S6). If voltage-conversion control means 302 determines that the vehicle is in the regenerative braking mode, control means 302 generates signal PWMC for converting an AC voltage from motor M1 into a DC voltage, provides signal PWMC to inverter 14, and accordingly controls inverter 14 such that inverter 14 converts the AC voltage from motor M1 into the DC voltage (step S7). Accordingly, switching of NPN transistors Q4, Q6 and Q8 of inverter 14 is controlled as discussed above by signal PWMC and inverter 14 converts the AC voltage from motor M1 into the DC voltage which is then supplied to up-converter 12.

Further, voltage-conversion control means 302 generates signal PWD and provides this signal to up-converter 12 in order to control up-converter 12 such that up-converter 12 down-converts the DC voltage from inverter 14 to charge DC power supply B (step S8). Then, in up-converter 12, NPN transistor Q1 is turned on while NPN transistor Q2 is turned off to down-convert the DC voltage from inverter 14 and accordingly charge DC power supply B (step S9). After this, this operation returns to step S2.

In step S6, if it is determined that the vehicle is not in the regenerative braking mode, motor-torque control means 301 generates signals PWU and PWM1 as described above based on torque control value TR and motor rotation number MRN from the external ECU, output voltage V1 of DC power supply B that is provided from voltage sensor 10, input voltage IVV from voltage sensor 13, and motor current MCRT from current sensor 24. The generated signals PWU and PWM1 are supplied respectively to up-converter 12 and inverter 14. Inverter 14 driving motor M1 is then controlled such that motor M1 outputs the torque which is designated by torque control value TR (step S10). The operation thereafter returns to step S2 and the steps discussed above are carried out.

In the flowchart shown in FIG. 4, the operation of steps S3 and S4 is performed, when the overvoltage is applied to the input of up-converter 12, by eliminating the cause for the overvoltage to continuously drive the auxiliary equipment. The operation of steps S7–S9 is performed, in the regenerative braking mode, by converting the AC voltage generated by motor M1 into the DC voltage to charge DC power supply B. The operation of step S10 is performed to allow motor M1 to generate torque.

Further, in the flowchart shown in FIG. 4, the determination as to whether voltage V2 on the input of up-converter 12 is higher than the predetermined value (step S2) precedes the determination as to whether the vehicle is in the regenerative braking mode (step S6) as described above, the determination regarding the regenerative braking mode may precede the determination as to whether voltage V2 is higher than the predetermined voltage. In this case, regardless of whether it is determined that the vehicle is in the regenerative braking mode or it is determined that the vehicle is not in the regenerative braking mode, the determination as to if voltage V2 is higher than the predetermined value is made.

Figure 5:
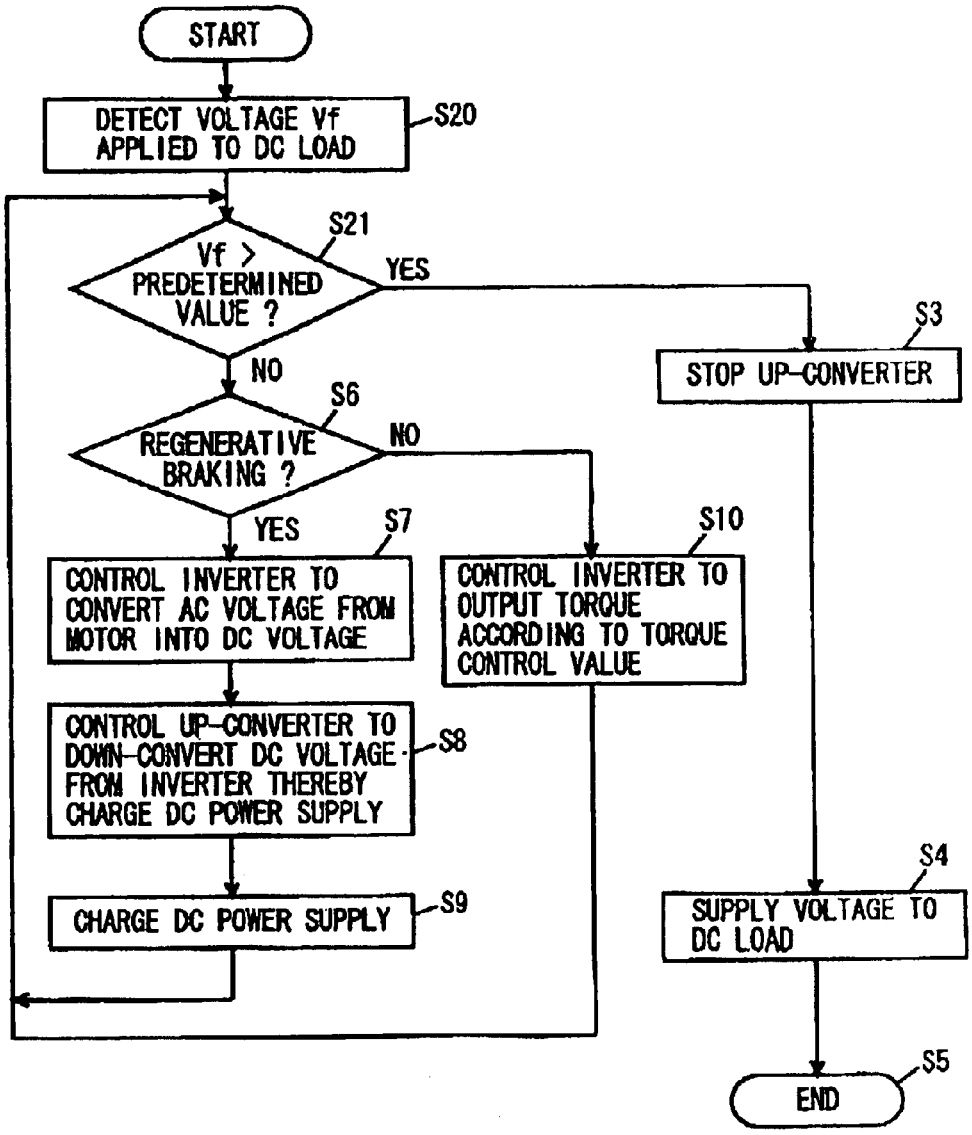
FIG. 5 is a flowchart illustrating another operation of the motor driver shown in FIG. 1.

Instead of the operation of motor driver 100 shown in the flowchart in FIG. 4, an operation shown in the flowchart in FIG. 5 may be employed. The flowchart in FIG. 5 is the same as that in FIG. 4 except that steps S1 and S2 in FIG. 4 are replaced with steps S20 and S21 respectively.

Referring to FIG. 5, the operation is started and voltage sensor 18 detects voltage Vf applied to the DC load (DC/DC converter 19) (step S20) and then outputs the detected voltage Vf to control unit 30. Voltage-conversion control means 302 of control unit 30 determines whether voltage Vf from voltage sensor 18 is higher than a predetermined value (step S21). If it is determined that voltage Vf is higher than the predetermined value, the operation proceeds to step S3. If it is determined that voltage Vf is equal to or lower than the predetermined value, the operation proceeds to step S6. Subsequent steps are the same as those described above in connection with the flowchart shown in FIG. 4.

In the flowchart shown in FIG. 5, the determination as to whether or not voltage Vf applied to the DC load is higher than the predetermined value (step S21) precedes the determination as to whether the vehicle is in the regenerative braking mode (step S6) as described above. Instead of this, the determination regarding the regenerative braking mode may precede the determination as to whether voltage Vf is higher than the predetermined value. In this case, regardless of whether it is determined that the vehicle is in the regenerative braking mode or it is determined that the vehicle is not in the regenerative braking mode, the determination as to if voltage Vf is higher than the predetermined value is made.

According to the flowchart shown in FIG. 5, when voltage Vf applied to the DC load (DC/DC converter 19) is higher than the predetermined value, it is determined that the overvoltage is applied to the DC load to stop up-converter 12 for eliminating the cause for the overvoltage. Therefore, the predetermined value used in step S21 is determined by the above-described method based on the withstand voltage of the DC load-related circuitry.

Figure 6:
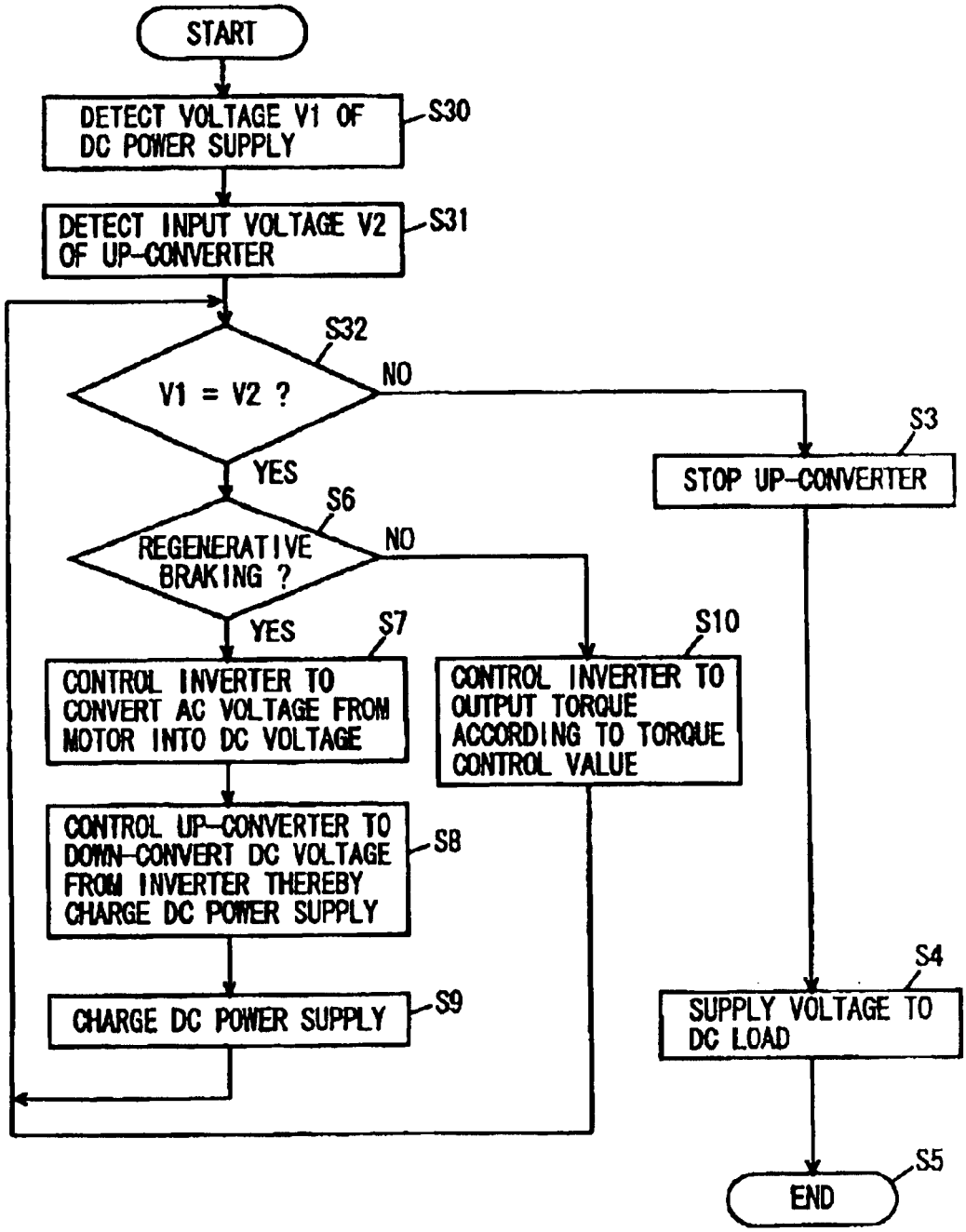
FIG. 6 is a flowchart illustrating still another operation of the motor driver shown in FIG. 1.

In addition, the operation of motor driver 100 may follow the flowchart shown in FIG. 6. The flowchart in FIG. 6 is the same as that in FIG. 4 except that steps S1 and S2 in FIG. 4 are replaced with steps S30–S32.

Referring to FIG. 6, the operation is started and voltage sensor 10 detects voltage V1 output from DC power supply B (step S30) and provides the detected voltage V1 to control unit 30. Voltage sensor 11 detects voltage V2 on the input of up-converter 12 (step S31) and provides the detected voltage V2 to control unit 30.

Voltage-conversion control means 302 of control unit 30 then determines whether voltage V1 from voltage sensor 10 matches voltage V2 from voltage sensor 11 (step S32). If voltage V1 does not match voltage V2, the operation proceeds to step S3. If voltage V1 matches voltage V2, the operation proceeds to step S6. The subsequent steps are the same as those described above in connection with FIG. 4.

Here, it is indicated in step S4 that the voltage is supplied to the DC load, which means that the voltage is supplied from capacitor C1 to DC/DC converter 19. If voltage V1 does not match voltage V2, DC power supply B is separated from capacitor C1 and accordingly, the power accumulated in capacitor C1 is supplied to DC/DC converter 19.

In the flowchart shown in FIG. 6, the determination as to whether or not voltage V1 matches voltage V2 (step S32) precedes the determination as to whether the vehicle is in the regenerative braking mode (step S6) as described above. Instead of this, the determination regarding the regenerative braking mode may precede the determination as to whether voltage V1 matches voltage V2. In this case, regardless of whether it is determined that the vehicle is in the regenerative braking mode or it is determined that the vehicle is not in the regenerative braking mode, the determination as to if voltage V1 matches voltage V2 is made.

According to the flowchart shown in FIG. 6, it is determined whether or not voltage V1 output from DC power supply B matches voltage V2 on the input of up-converter 12 and, up-converter 12 is stopped if the voltages do not match. The fact that voltage V1 does not match voltage V2 indicates that DC power supply B is separated from capacitor C1, up-converter 12 and DC/DC converter 19 due to any malfunction of system relays SR1 and SR2 or brake. In this case, if regenerative braking occurs with DC power supply B separated, an overvoltage is applied to the input of up-converter 12. In order to avoid this, up-converter 12 is stopped for eliminating the cause for the overvoltage when it is found that DC power supply B is separated. Here, control unit 30 does not particularly control inverter 14.

According to the present invention as discussed above, voltage-conversion control means 302 judges whether or not an overvoltage is applied to the input of up-converter 12 according to whether input voltage V2 of up-converter 12 is higher than a predetermined value or not, or whether voltage Vf applied to the DC load is higher than a predetermined value or not. When control means 302 judges that the overvoltage is applied thereto, control means 302 stops up-converter 12. Moreover, according to the present invention, voltage-conversion control means 302 detects whether or not DC power supply B is separated according to the determination as to whether or not output voltage V1 of DC power supply B matches input voltage V2 of up-converter 12. Then, if DC power supply B is separated, up-converter 12 is stopped.

The present invention is thus characterized in that up-converter 12 is stopped when the overvoltage is applied to the input of up-converter 12 or DC power supply B is separated. Specifically, the fact that the overvoltage is applied to the input of up-converter 12 or the fact that DC power supply B is separated means any malfunction occurs in the electrical system between the DC power supply and a voltage converter (up-converter 12). Here, the operation of stopping up-converter 12 corresponds to control of the voltage converter (up-converter 12) for protecting the electrical system of the DC load.

Moreover, the present invention is characterized in that, in the motor driver having one motor M1, up-converter 12 is stopped when any malfunction occurs in the electrical system between the DC power supply and the voltage converter (up-converter 12).

When voltage V2 from voltage sensor 11 is used for detecting an overvoltage on the input of up-converter 12, voltage sensor 11, up-converter 12, inverter 14, DC/DC converter 19, and control unit 30 constitute "load driver."

In addition, when voltage Vf from voltage sensor 18 is used for detecting the overvoltage on the DC load, up-converter 12, inverter 14, voltage sensor 18, DC/DC converter 19, and control unit 30 constitute "load driver."

Further, when voltage V1 from voltage sensor 10 and voltage V2 from voltage sensor 11 are used for detecting whether DC power supply B is separated or not, voltage sensors 10 and 11, up-converter 12, inverter 14, DC/DC converter 19, and control unit 30 constitute "load driver."

According to the description above, it is detected that DC power supply B is separated if voltage V1 from voltage sensor 10 does not match voltage V2 from voltage sensor 11. Instead of this, the ECU external to the voltage converter may detect whether DC power supply B is separated or not according to the present invention. In this case, control unit 30 receives a detection signal indicative of separation of DC power supply B from the external ECU and, according to the detection signal, control unit 30 generates signal STP for stopping up-converter 12 and provides the signal STP to up-converter 12.

Further, according to the description above, motor M1 generates electric power. The device with the power-generating function may generally be an AC power generator according to the present invention.

In addition, according to the description above, the electrical system of the DC load connected to the DC power supply B is constituted of DC/DC converter 19, inverter 20 and air-conditioner motor 21. Here, the electrical system may be any auxiliary equipment or circuitry mounted on a hybrid or electric vehicle.

According to the present invention, a control method for safely driving the DC load follows any of the flowcharts shown in FIGS. 4–6 respectively.

Moreover, the control by control unit 30 for safely driving the DC load is actually carried out by a CPU (Central Processing Unit). CPU reads, from a ROM (Read-Only Memory), a program including the steps shown in any of the flowcharts in FIGS. 4–6, and then executes the program read from the ROM to control driving of the DC load according to any of the flowcharts shown in FIGS. 4–6. The ROM thus corresponds to a computer (CPU)-readable recording medium on which a program is recorded that includes the steps of any of the flowcharts shown respectively in FIGS. 4–6.

According to the first embodiment, the load driver has the control unit which controls the up-converter in such a way that the up-converter is stopped from operating if any malfunction occurs in the electrical system between the DC power supply and the up-converter. Accordingly, an overvoltage is prevented from being applied to the input of the up-converter.

Second Embodiment

Figure 7:
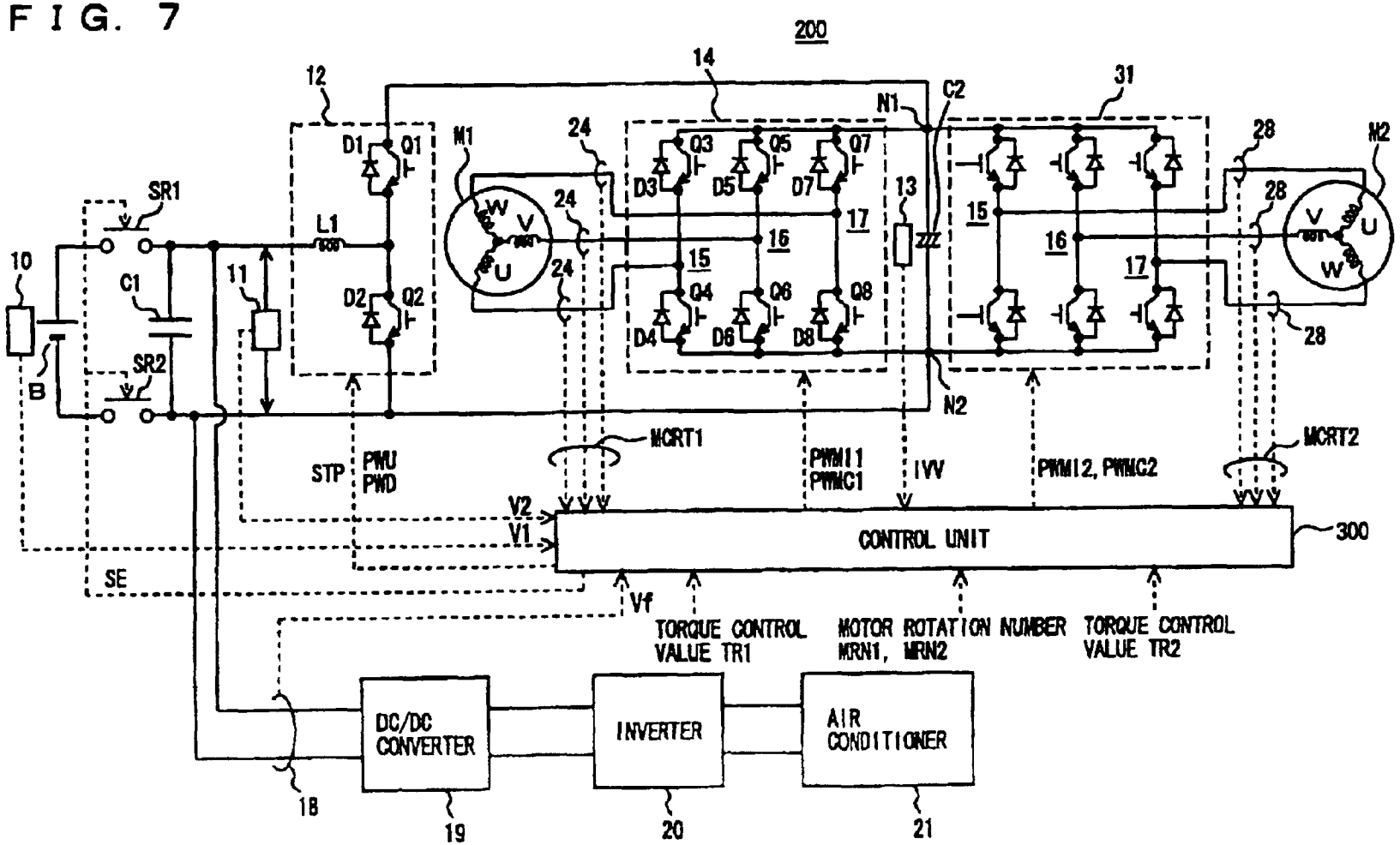
FIG. 7 is a block diagram schematically showing a motor driver according to a second embodiment of the present invention.

Referring to FIG. 7, a motor driver 200 having a load driver according to a second embodiment includes a DC power supply B, voltage sensors 10, 11, 13 and 18, system relays SR1 and SR2, capacitors C1 and C2, an up-converter 12, inverters 14 and 31, current sensors 24 and 28, and a control unit 300. Motor driver 200 drives two motors M1 and M2. Of the motors M1 and M2, one motor M1 generates torque for driving drive wheels of a hybrid or electric vehicle and the other motor M2 is used for a power generator or for auxiliary equipment if the vehicle is the hybrid vehicle and is used for auxiliary equipment if the vehicle is the electric vehicle.

DC power supply B, voltage sensors 10, 11, 13 and 18, system relays SR1 and SR2, capacitors C1 and C2, up-converter 12, inverter 14, and current sensor 24 are as those described above in connection with the first embodiment. Here, capacitor C2 receives a DC voltage from up-converter 12 via nodes N1 and N2 to smooth the received DC voltage and supplies the smoothed voltage to inverter 31 as well as inverter 14.

Current sensor 24 detects a motor current MCRT1 which is then provided to control unit 300. Inverter 14 converts, according to a signal PWMI1 from control unit 330, the DC voltage from capacitor C2 into an AC voltage to drive motor M1 and, according to a signal PWMC1, converts an AC voltage generated by motor M1 into a DC voltage.

Inverter 31 has the same configuration as that of inverter 14. Inverter 31 converts, according to a signal PWMI2 from control unit 300, the DC voltage from capacitor C2 into an AC voltage to drive motor M2 and, according to a signal PWMC2, converts an AC voltage generated by motor M2 into a DC voltage. Current sensor 28 detects a motor current MCRT2 flowing to each phase of motor M2 and outputs the detected current to control unit 300.

Control unit 300 receives output voltage V1 of DC power supply B from voltage sensor 10, receives voltage V2 on the input of up-converter 12 from voltage sensor 11, receives motor currents MCRT1 and MCRT2 from respective current sensors 24 and 28, receives input voltage IVV to inverters 14 and 31 from voltage sensor 13, and receives torque control values TR1 and TR2 and motor rotation number MRN1 and MRN2 from an external ECU. Based on voltage V1, input voltage IVV, motor current MCRT1, torque control value TR1 and motor rotation number MRN1, control unit 300 generates signal PWMI1 for controlling switching of NPN transistors Q3–Q8 of inverter 14 when inverter 14 drives motor M1 following the above-described method, and provides the generated signal PWMI1 to inverter 14.

Further, based on voltage V1, input voltage IVV, motor current MCRT 2, torque control value TR2 and motor rotation number MRN2, control unit 300 generates signal PWMI2 for controlling switching of NPN transistors Q3–Q8 of inverter 31 when inverter 31 drives motor M2 following the above-described method, and provides the generated signal PWMI2 to inverter 31.

When inverter 14 (or 31) drives motor M1 (or M2), control unit 300 generates signal PWU for controlling switching of NPN transistors Q1 and Q2 of up-converter 12 following the above-described method, based on voltage V1, input voltage IVV, motor current MCRT1 (or MCRT2), torque control value TR1 (or TR2) and motor rotation number MRN1 (or MRN2) and provides the generated signal PWU to up-converter 12.

Further, control unit 300 determines, based on voltage V2 from voltage sensor 11 or voltage Vf from voltage sensor 18, whether or not the overvoltage is applied to the input of up-converter 12, following the above-described method. If the overvoltage is applied thereto, control unit 300 generates signal STP for stopping up-converter 12 and provides the signal STP to up-converter 12. Alternatively, control unit 300 may determine, based on voltages V1 and V2, whether or not DC power supply B is separated, following the above-described method to generate signal STP for stopping up-converter 12 if DC power supply B is separated and provide the generated signal STP to up-converter 12.

In regenerative braking mode, control unit 300 generates signal PWMC1 for converting the AC voltage generated by motor M1 into the DC voltage or generates signal PWMC2 for converting the AC voltage generated by motor M2 into the DC voltage, and supplies the generated signal PWMC1 or PWMC2 to inverter 14 or inverter 31, respectively. At this time, control unit 300 generates signal PWD for controlling up-converter 12 such that up-converter 12 down-converts the DC voltage from inverter 14 or 31 to charge DC power supply B, and provides the generated signal PWD to up-converter 12.

In addition, control unit 300 generates signal SE for making system relays SR1 and SR2 on to provide the signal SE to system relays SR1 and SR2.

Figure 8:
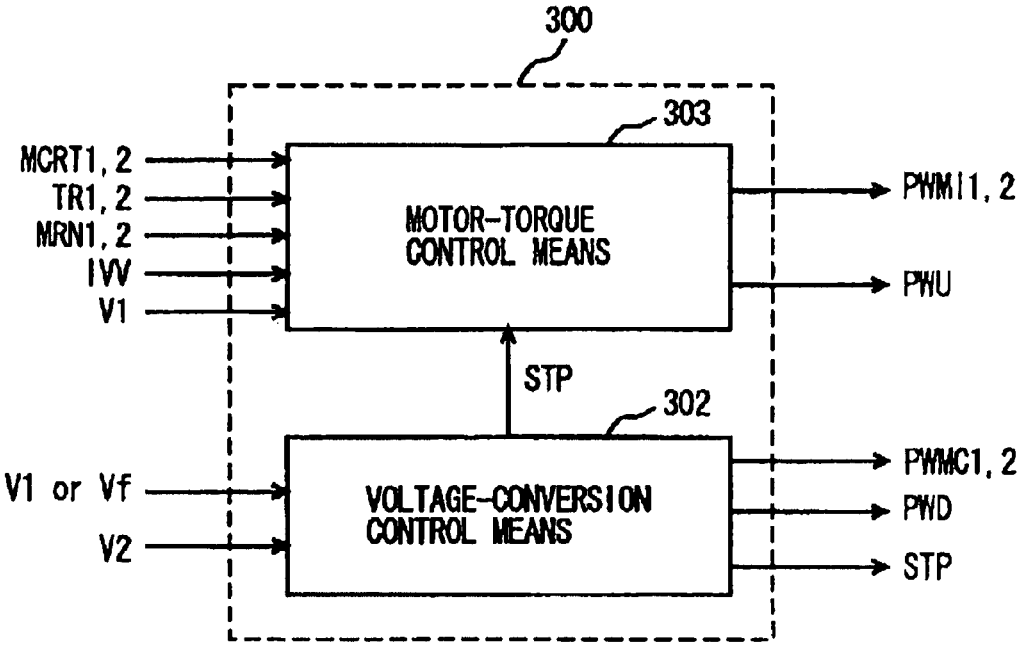
FIG. 8 is a functional block diagram of a control unit shown in FIG. 7.

FIG. 8 is a functional block diagram of control unit 300. Control unit 300 includes voltage-conversion control means 302 and motor-torque control means 303. Voltage-conversion control means 302 performs, in addition to the functions discussed in connection with the first embodiment, a function of outputting signal STP not only to up-converter 12 but also motor-torque control means 303. This signal STP is generated by control means 302 when it is detected that the overvoltage is applied to the input of up-converter 12 or that DC power supply B is separated. Voltage-conversion control means 302 generates, in regenerative braking mode, two signals PWMC1 and PWMC2 to be supplied to inverters 14 and 31 respectively.

Further, motor-torque control means 303 performs a function in addition to the functions discussed above in connection with the first embodiment. Specifically, when motor-torque control means 303 receives signal STP from voltage-conversion control means 302, motor-torque control means 303 generates signals for driving motors M1 and M2 to maintain a balance between supply and consumption of the electric energy held in the circuitry on the output side of up-converter 12, that is, the balance between the supply and consumption of the electric energy is kept with respect to motors M1 and M2. The signals thus generated by motor-torque control means 303 are output respectively to inverters 14 and 31. Here again, switching of NPN transistors Q3–Q8 in inverters 14 and 31 is controlled and accordingly, motor-torque control means 303 provides, to inverters 14 and 31, respective signals PWMI1 and PWMI2 for driving motors M1 and M2 to maintain a balance between supply and consumption (of electric energy) with respect to motor M1 and motor M2. Then, inverter 14 drives motor M1 according to signal PWMI1 while inverter 31 drives motor M2 according to signal PWMI2 in such a way that the balance between supply and consumption of the electric energy with respect to motors M1 and M2 is maintained.

Motor driver 200 operates as discussed below. Motor driver 200 stops up-converter 12 when the overvoltage is detected on the input of up-converter 12. The operation here of motor driver 200 thus follows the flowchart shown in FIG. 4 or FIG. 5.

Figure 9:
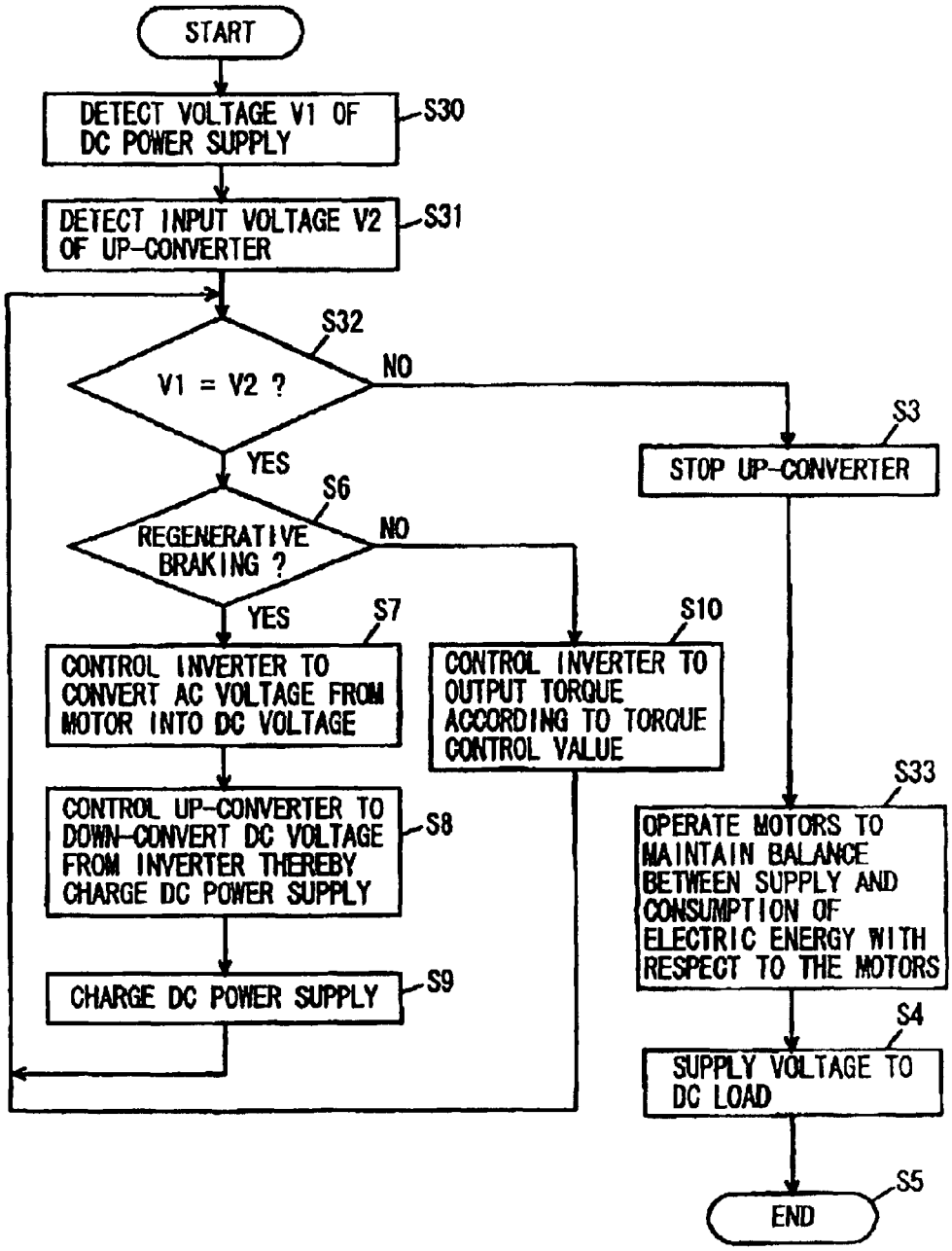
FIG. 9 is a flowchart illustrating an operation of the motor driver shown in FIG. 7.

Motor driver 200 may alternatively operate following the flowchart shown in FIG. 9. The flowchart in FIG. 9 is the same as that in FIG. 6 except that the flowchart in FIG. 9 includes an additional step S33.

Referring to FIG. 9, up-converter 12 is stopped (step S3), and then motors M1 and M2 are operated to keep the balance between supply and consumption of the electric energy with respect to motors M1 and M2 (step S33). The operation here then proceeds to step S4 described above.

Motors M1 and M2 may be operated in various manners in step S33. Motors M1 and M2 may typically be operated as follows:

(1) when up-converter 12 is stopped, motors M1 and M2 are operated with the electric power accumulated in capacitor C2; or (2) one of motors M1 and M2 serves as a regenerative power generator to generate power which is used for charging capacitor C2 and accordingly operating the other motor.

When the motors are operated in manner (1), motor torque control means 303 generates signals PWMI1 and PWMI2 by the above-discussed method to output the signals to inverters 14 and 31 respectively. According to signal PWMI1, inverter 14 converts the DC voltage from capacitor C2 into an AC voltage for driving motor M1. According to signal PWMI2, inverter 31 converts the DC voltage from capacitor C2 into an AC voltage for driving motor M2. Motors M1 and M2 are stopped from operating when the electric power accumulated in capacitor C2 becomes zero.

When the motors are operated in manner (2), motor torque control means 303 generates, by the above-described method, signals PWMI1 and PWMC2 or signals PWMC1 and PWMI2 to provide the signals to inverters 14 and 31. If motor torque control means 303 outputs signals PWMI1 and PWMC2, inverter 31 converts an AC voltage generated by motor M2 into a DC voltage in response to signal PWMC2 to charge capacitor C2 while inverter 14 converts the DC voltage from capacitor C2 into an AC voltage in response to signal PWMI1 to drive motor M1.

If motor torque control means 303 outputs signals PWMC1 and PWMI2, inverter 14 converts an AC voltage generated by motor M1 into a DC voltage in response to signal PWMC1 to charge capacitor C2 while inverter 31 converts the DC voltage from capacitor C2 into an AC voltage in response to signal PWMI2 to drive motor M2.

In this way, when up-converter 12 is stopped for the reason that DC power supply B is separated, motors M1 and M2 are operated to maintain the balance between supply and consumption of the electric energy with respect to motors M1 and M2.

Other details are the same as those of the first embodiment.

According to the description above, two motors are employed. Instead, three or more motors may be used according to the present invention. In this case, depending on the number of additional motors, one or any number of combinations each consisting of a motor and an inverter for driving the motor are connected to nodes N1 and N2 shown in FIG. 7. Specifically, one or any number of combinations each of a motor and an inverter are connected in parallel to nodes N1 and N2.

The second embodiment applied to the motor driver driving at least two motors is characterized in that, as the first embodiment, the up-converter is stopped when the overvoltage is detected on the input of the up-converter.

Moreover, the second embodiment applied to the motor driver driving at least two motors is characterized in that the up-converter is stopped when the DC power supply is separated while the motors are operated to keep the balance between supply and consumption of the electric energy with respect to these motors.

Here, when voltage V2 from voltage sensor 11 is used to detect the overvoltage on the input of up-converter 12, voltage sensor 11, up-converter 12, inverter 14, DC/DC converter 19 and control unit 300 constitute "load driver."

When voltage Vf from voltage sensor 18 is used to detect the overvoltage to the DC load, up-converter 12, inverter 14, voltage sensor 18, DC/DC converter 19 and control unit 300 constitute "load driver."

When voltage V1 from voltage sensor 10 and voltage V2 from voltage sensor 11 are used to detect that DC power supply B is separated, voltage sensors 10 and 11, up-converter 12, inverter 14, DC/DC converter 19 and control unit 300 constitute "load driver."

According to the present invention, a control method for safely driving the DC load follows any of the flowcharts shown respectively in FIGS. 4, 5 and 9.

The control by control unit 300 for safely driving the DC load is actually carried out by a CPU (Central Processing Unit). CPU reads, from a ROM (Read-Only Memory), a program including the steps shown in any of the flowcharts in FIGS. 4, 5 and 9, and then executes the program read from the ROM to control driving of the DC load according to any of the flowcharts shown in FIGS. 4, 5 and 9. The ROM thus corresponds to a computer (CPU)-readable recording medium on which a program is recorded that includes the steps of any of the flowcharts shown respectively in FIGS. 4, 5 and 9.

According to the second embodiment, the load driver has the control unit which controls the up-converter in such a way that the up-converter is stopped from operating if any malfunction occurs in the electrical system between the DC power supply and the up-converter. Accordingly, the overvoltage is prevented from being applied to the input of the up-converter.

In addition, when any malfunction occurs in the electrical system between the DC power supply and the up-converter, the control unit of the load driver stops the up-converter from operating and then controls a plurality of inverters respectively driving a plurality of motors in such a way that the balance between supply and consumption of electric energy with respect to these motors is maintained. Accordingly, the electrical system of the DC load connected between the DC power supply and the up-converter is protected and the energy is effectively used.

Third Embodiment

Figure 10:
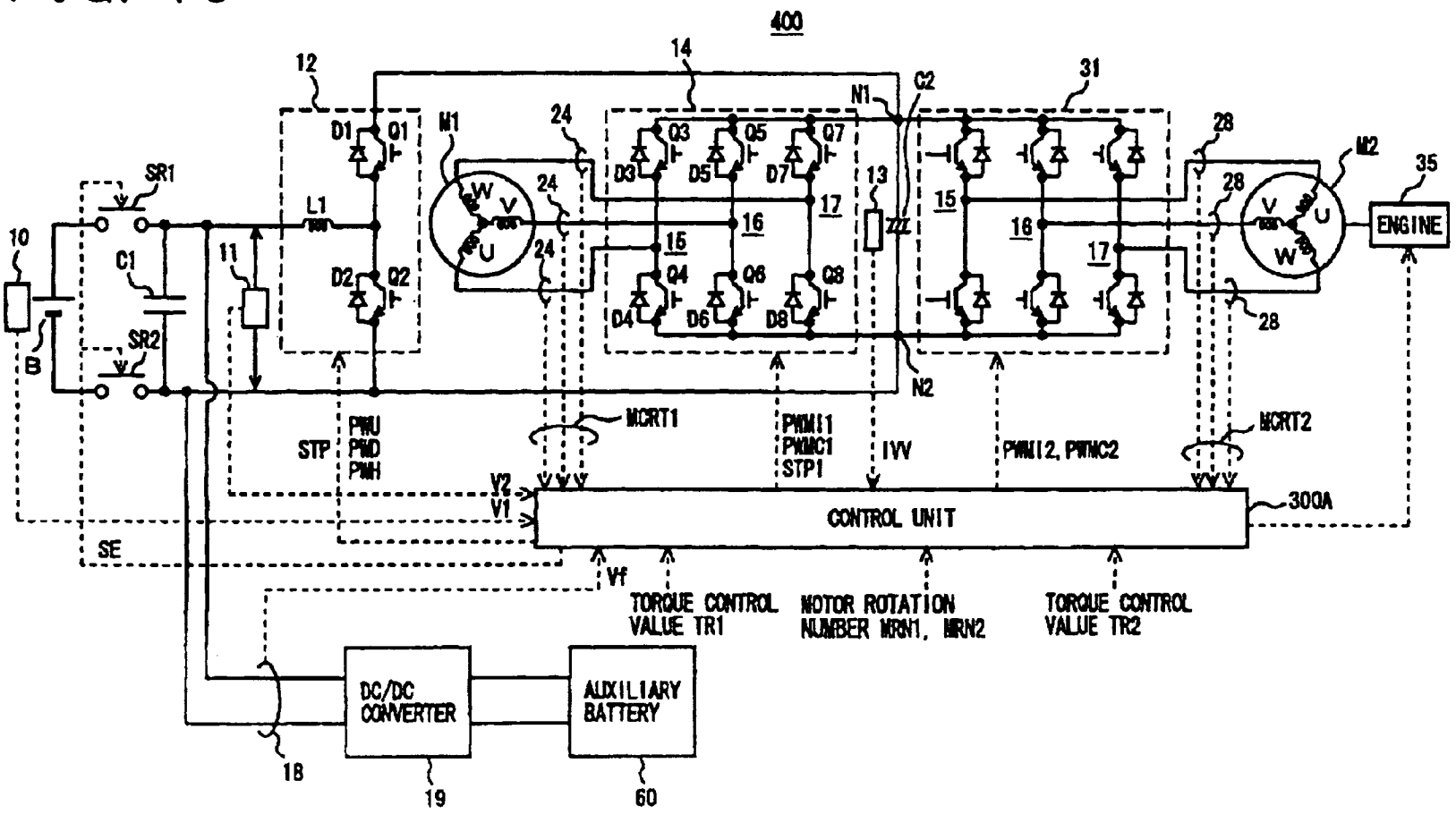
FIG. 10 is a block diagram schematically showing a motor driver according to a third embodiment of the present invention.

Referring to FIG. 10 a motor driver 400 having a load driver according to a third embodiment is the same as motor driver 200 except that motor driver 400 includes a control unit 300A instead of control unit 300 of motor driver 200. In addition, an engine 35 is connected to motor M2. Motor M2 thus serves to electromagnetically transmit torque from the output shaft of engine 35 to the vehicle-driving-shaft and also serves as a power generator converting a part or the whole of engine torque into electric energy. In addition, an auxiliary battery 60 is connected to the DC/DC converter 19.

In motor driver 400, DC/DC converter 19 is connected between DC power supply B and up-converter 12 to down-convert a DC voltage from DC power supply B and accordingly charge auxiliary battery 60 (e.g. output voltage 12 V). As DC/DC converter 19 is placed between DC power supply B and up-converter 12, a required withstand voltage of DC/DC converter 19 is determined according to an output voltage of DC power supply B. Then, the withstand voltage of DC/DC converter 19 placed between DC power supply B and up-converter 12 is smaller than that of DC/DC converter 19 placed between up-converter 12 and inverters 14 and 31.

Moreover, requirements of the specification of the components of DC/DC converter 19 are made less severe, which means the circuit configuration of DC/DC converter 19 may be simplified. Consequently, reduction in the cost and size of DC/DC converter 19 is achieved.

Auxiliary battery 60 is used as a power supply of such a control circuit as control unit 300A.

Control unit 300A performs, in addition to the functions of control unit 300, a function as specifically described below.

When voltage V1 from voltage sensor 10 does not match voltage V2 from voltage sensor 11, control unit 300A decreases the output of engine 35 while controlling inverters 14 and 31 in such a way that the DC voltage obtained by converting, by inverter 31, the voltage generated by motor M2 is lower than the withstand voltage of DC/DC converter 19.

More specifically, control unit 300A generates signal PWMC2 for converting the AC voltage generated by motor M2 from torque of engine 35 into the DC voltage to supply the generated signal to inverter 31, and generates signal PWMI1 for converting the DC voltage from capacitor C2 into the AC voltage to drive motor M1 or a signal STP1 for stopping inverter 14 to provide the resultant signal to inverter 14.

When the DC voltage obtained by converting by inverter 31 the voltage generated by motor M2 based on the torque from engine 35 is equal to or higher than the withstand voltage of DC/DC converter 19, control unit 300A drives inverter 14 such that voltage IVV from voltage sensor 13 is lower than the withstand voltage of DC/DC converter 19. Then, control unit 300A generates signal PWMI1 and provides this signal to inverter 14 for converting the DC voltage from capacitor C2 into an AC voltage so as to cause a part of the DC power accumulated in capacitor C2 to be consumed by motor M1.

On the other hand, signal STP1 is generated and provided to inverter 14 for stopping inverter 14 when the DC voltage obtained by converting by inverter 31 the voltage generated by motor M2 based on torque from engine 35 is lower than the withstand voltage of DC/DC converter 19.

In this way, control unit 300A controls inverters 14 and 31 such that the AC voltage generated based on the torque of engine 35 is converted into a DC voltage which is lower than the withstand voltage of DC/DC converter 19.

Moreover, control unit 300A generates signal PWH for keeping NPN transistor Q2 continuously in OFF state and keeping NPN transistor Q1 continuously in ON state and provides signal PWH to up-converter 12. Then the configuration of up-converter 12 is changed to allow up-converter 12 to directly output a DC voltage supplied from nodes N1 and N2 to DC power supply B. Then, the voltage generated by motor M2 and converted by inverters 31 into a DC voltage is supplied to DC/DC converter 19.

Preferably, when voltage V1 does not match voltage V2, control unit 300A determines whether voltage V2 from voltage sensor 11 (or voltage Vf from voltage sensor 18) is equal to or more than a predetermined value. Then, if voltage V2 (or voltage Vf) is smaller than the predetermined value, control unit 300A controls engine 35 and inverters 14 and 31 to supply the voltage generated by motor M2 and converted by inverter 31 into the DC voltage directly by DC/DC converter 19.

As discussed above, when voltage V1 does not match voltage V2, that is, when it is detected that DC power supply B is separated from capacitor C1, up-converter 12 and DC/DC converter 19, control unit 300A controls engine 35 and inverters 14 and 31 to generate a DC voltage lower than the withstand voltage of DC/DC converter 19 and supply the generated DC voltage directly to DC/DC converter 19. Preferably, control unit 300A confirms that no overvoltage is applied to DC/DC converter 19 to directly supply the voltage generated by motor M2 and converted by inverter 31 into the DC voltage to DC/DC converter 19.

Figure 11:
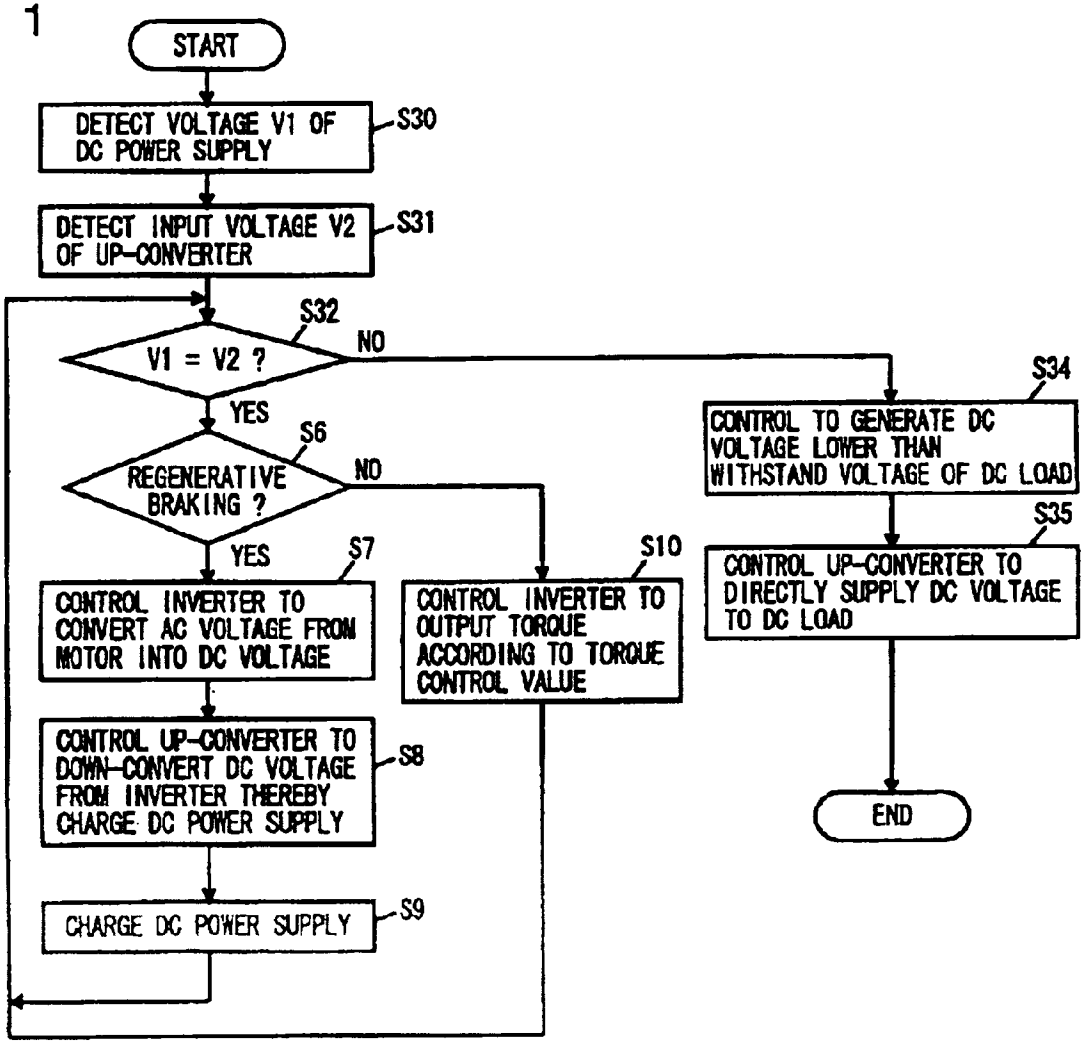
FIG. 11 is a flowchart illustrating an operation of the motor driver shown in FIG. 10.

Referring to FIG. 11, motor driver 400 operates as detailed below. The flowchart in FIG. 11 is the same as that in FIG. 6 except that steps S3 and S4 in the flowchart shown in FIG. 6 are replaced with steps S34 and S35 in the flowchart shown in FIG. 11.

Referring to FIG. 11, it is determined in step S32 that voltage V1 does not match voltage V2. Then, control unit 300A controls engine 35 to decrease the output therefrom and generates signal PWMC2 for converting an AC voltage generated by motor M2 based on torque of engine 35 into a DC voltage to provide the generated signal to inverter 31. Further, control unit 300A generates signal PWMI1 or signal STP1 to provide the generated signals to inverter 14 as described above (step S34).

Control unit 300A generates signal PWH which is output to up-converter 12. The AC voltage generated based on the torque of engine 35 is converted into the DC voltage which is lower than the withstand voltage of DC/DC converter 19. The resultant DC voltage is directly supplied via up-converter 12 to DC/DC converter 19 (step S35). A series of steps of this operation is completed accordingly. Other details are as those described in connection with the first embodiment.

Figure 12:
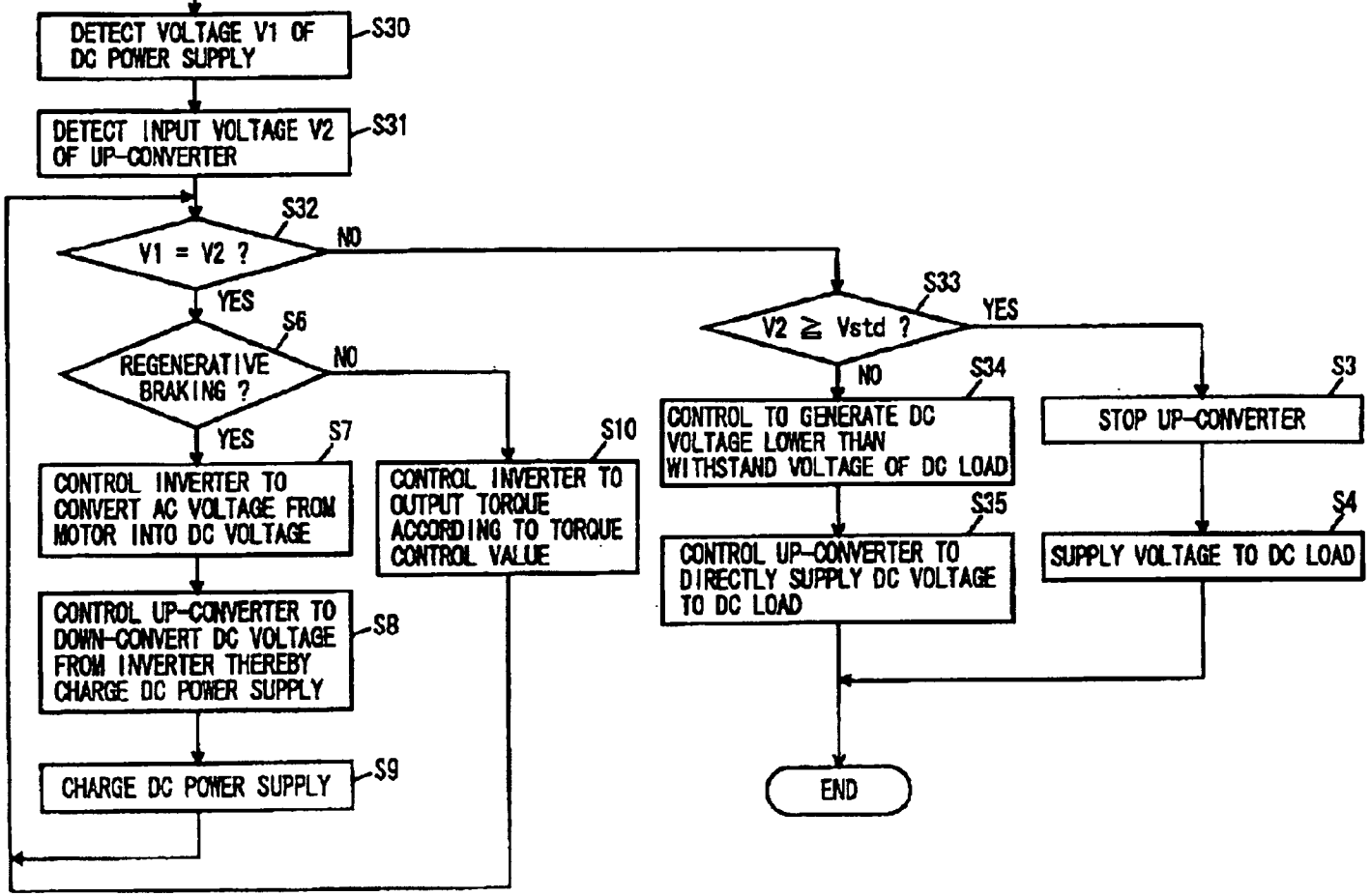
FIG. 12 is a flowchart illustrating another operation of the motor driver shown in FIG. 10.

Motor driver 400 may operate following the flowchart shown in FIG. 12. The flowchart in FIG. 12 is the same as that in FIG. 11 except that steps S33, S3 and S4 are added to the flowchart of FIG. 11. The operation of steps S3 and S4 is as described above in connection with the first embodiment.

Referring to FIG. 12, it is determined in step S32 that voltage V1 does not match voltage V2. Then, control unit 300A determines whether or not voltage V2 from voltage sensor 11 (or voltage Vf from voltage sensor 18) is equal to or higher than a predetermined value Vstd (step S33). In step S33 if it is determined that voltage V2 (or voltage Vf) is equal to or more than predetermined value Vstd, the operation proceeds to step S3. If it is determined that voltage V2 (or voltage Vf) is smaller than predetermined value Vstd, the operation proceeds to step S34. After this, steps S3 and S4 or steps S34 and S35 are carried out.

In other words, when voltage V2 (or voltage Vf) is equal to or more than predetermined value Vstd, up-converter 12 is stopped to supply electric power accumulated in capacitor C1 to DC/DC converter 19. When it is determined that voltage V2 (or voltage Vf) is smaller than predetermined value Vstd, voltage generated by motor M2 based on the torque of engine 35 and converted into DC voltage by inverter 31 is supplied directly to DC/DC converter 19.

According to the third embodiment as described above, when any failure in system relays SR1 and SR2 or brake causes DC power supply B to be separated from capacitor C1, up-converter 12 and DC/DC converter 19, the voltage generated according to the torque of engine 35 and converted into the DC voltage lower than the withstand voltage of DC/DC converter 19 is directly supplied to DC/DC converter 19.

Preferably, the DC voltage generated according to the torque of engine 35 and converted into the DC voltage lower than the withstand voltage of DC/DC converter 19 is supplied directly to DC/DC converter 19 after it is confirmed that no overvoltage is applied to DC/DC converter 19.

In this way, even if DC power supply B is separated from capacitor C1, up-converter 12 and DC/DC converter 19, DC/DC converter 19 can continue its operation. Then, the vehicle with motor driver 400 mounted thereon surely keeps moving.

Voltage sensors 10, 11 and 18, up-converter 12, inverters 14 and 31, DC/DC converter 19 and control unit 300A constitute "load driver."

A control method according to the present invention for safely driving a DC load follows the flowchart shown in FIG. 11 or 12.

Moreover, the control by control unit 300A for safely driving the DC load is actually carried out by a CPU (Central Processing Unit). CPU reads, from a ROM (Read-Only Memory), a program including the steps shown in the flowchart in FIG. 11 or 12, and then executes the program read from the ROM to control driving of the DC load according to the flowchart shown in FIG. 11 or 12. The ROM thus corresponds to a computer (CPU)-readable recording medium on which a program is recorded that includes the steps of the flowchart shown in FIG. 11 or 12.

Other details are the same as those of the second embodiment.

According to the third embodiment, the load driver has the control unit and, under the control by the control unit, the power generated based on the torque of the engine is converted into the DC voltage lower than the withstand voltage of the DC load and the resultant DC voltage is supplied directly to the DC load, when the DC power supply is separated. The DC load can thus be kept driven while the DC load connected between the DC power supply and the up-converter is protected.

Fourth Embodiment

Figure 13:
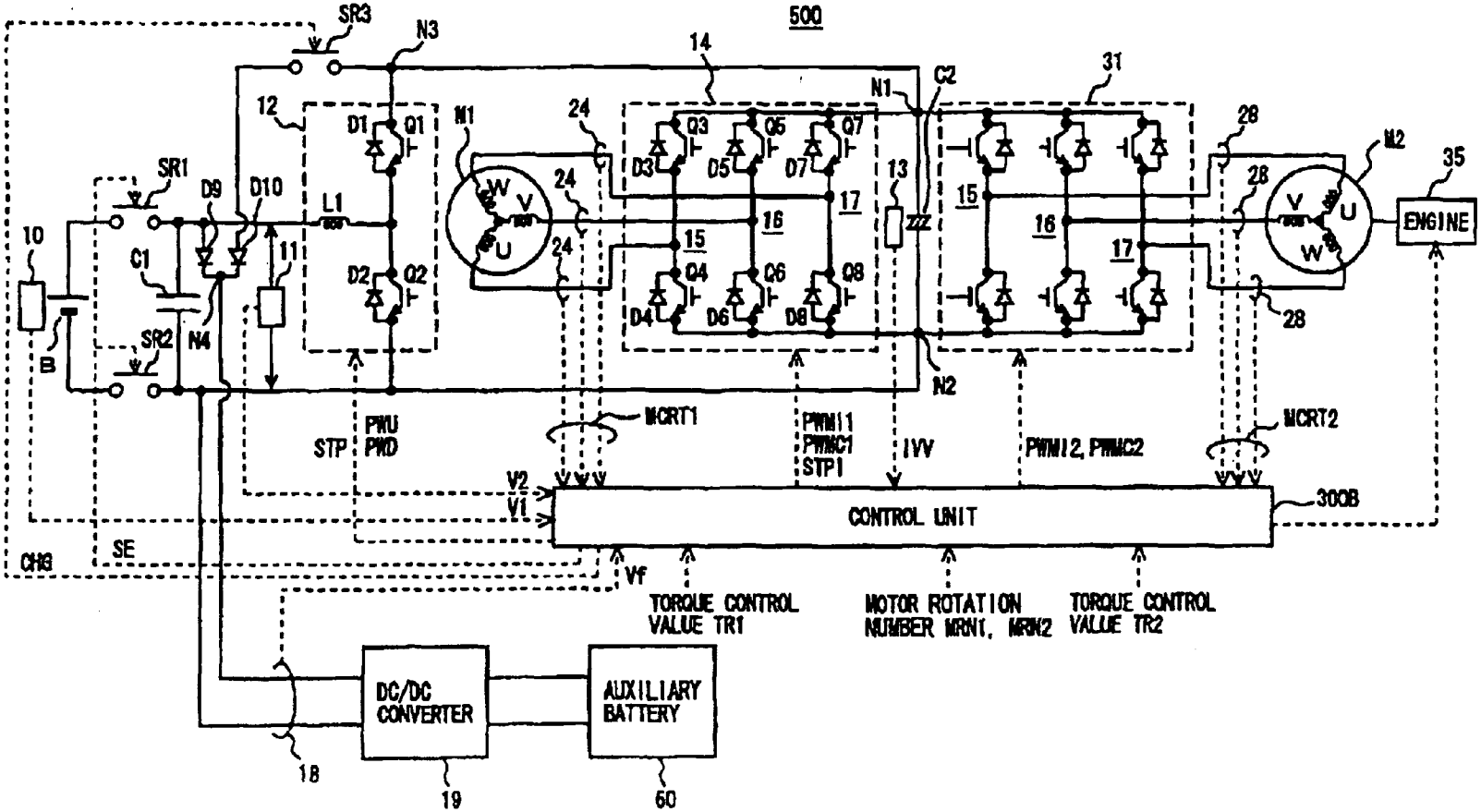
FIG. 13 is a block diagram schematically showing a motor driver according to a fourth embodiment.

Referring to FIG. 13, a motor driver 500 having a load driver according to a fourth embodiment is the same as motor driver 400 except that control unit 300A of motor driver 400 is replaced with a control unit 300B and that motor driver 500 includes diodes D9 and D10 and a system relay SR3 in addition to the components of motor driver 400.

System relay SR3 and diode D10 are connected in series between node N3 and node N4. Diode D10 is connected in the direction in which a DC current flows from system relay SR3 to node N4. System relay SR3 is made on/off in response to a signal CHG from control unit 300B.

Diode D9 is connected between a power supply line of DC power supply B and node N4. Diode D9 is connected in the direction in which a DC current from DC power supply B flows to node N4.

Even when diodes D9 and D10 cause system relay SR3 to be made on, short circuit is prevented that occurs between DC power supply B and inverters 14 and 31 through the path of system relay SR3 and diode D10.

In addition to the functions of control unit 300A, control unit 300B performs a function of generating signal CHG to be output to system relay SR3 for turning on/off system relay SR3.

As for motor driver 500, control unit 300B controls inverters 14 and 31 and engine 35 in such a way that, when voltage V1 does not match voltage V2, a DC voltage lower than the withstand voltage of DC/DC converter 19 is generated and supplied to up-converter 12 via nodes N1 and N2. Control unit 300B further generates signal STP for stopping up-converter 12 as well as signal CHG for making system relay SR3 on and provides the signals respectively to up-converter 12 and system relay SR3.

Accordingly, the voltage generated based on the torque of engine 35 and converted into a DC voltage is supplied via nodes N1 and N2 to up-converter 12 and supplied directly to DC/DC converter 19 via system relay SR3 and diode D10.

In this way, the operation of DC/DC converter 19 can be continued while overvoltage is prevented from being applied.

Figure 14:
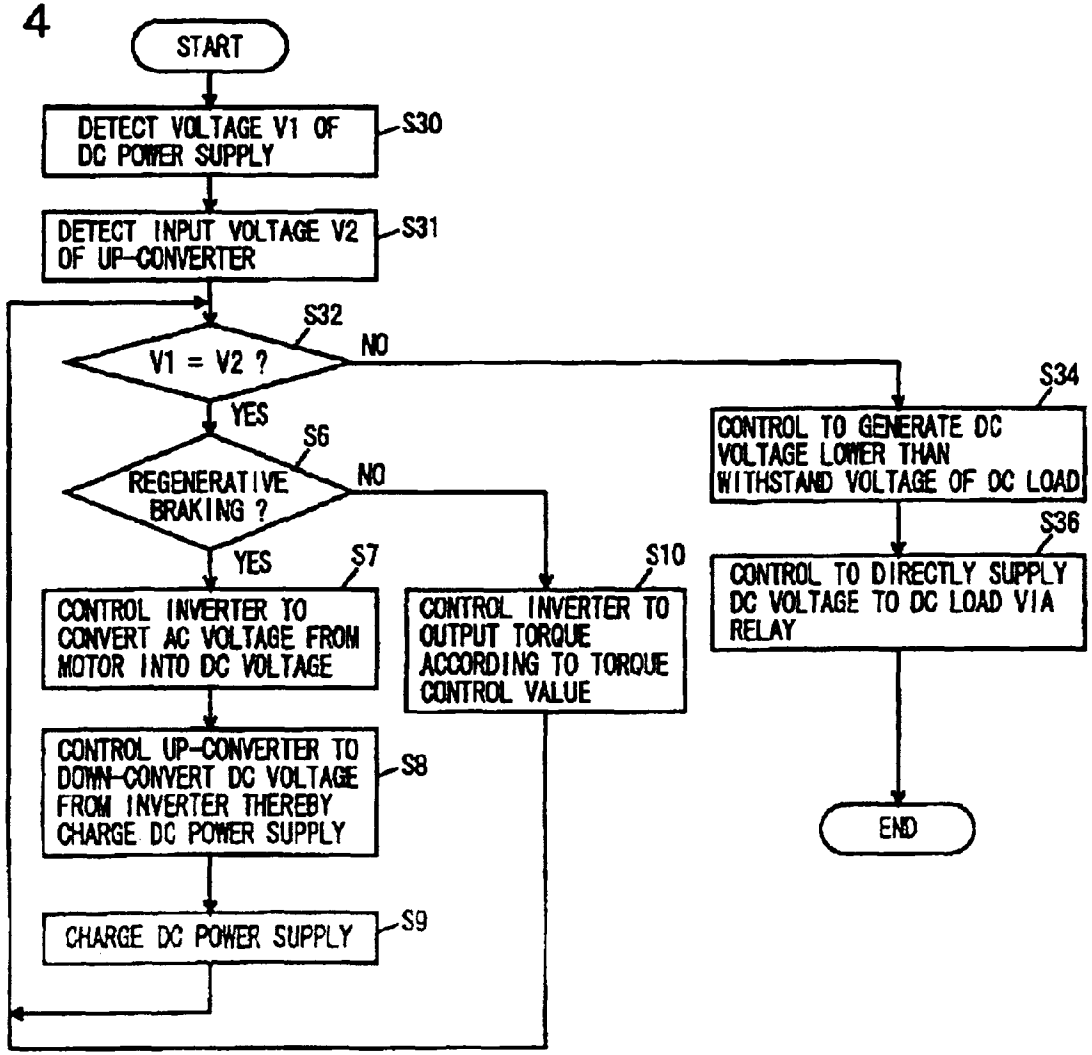
FIG. 14 is a flowchart illustrating an operation of the motor driver shown in FIG. 13.

Referring to FIG. 14, motor driver 500 operates as described below. The flowchart in FIG. 14 is the same as the flowchart in FIG. 11 except that step S35 in FIG. 11 is replaced with step S36.

After step S34, control unit 300B generates signal STP for stopping up-converter 12 and signal CHG for making system relay SR3 on and provides the generated signals respectively to up-converter 12 and system relay SR3.

The voltage generated based on the torque of engine 35 and converted into the DC voltage is thus supplied via nodes N1 and N2 to up-converter 12 and directly to DC/DC converter 19 via system relay SR3 and diode D10 (step S36). A series of the steps of the operation is then completed. Other details of the operation are described above.

Figure 15:
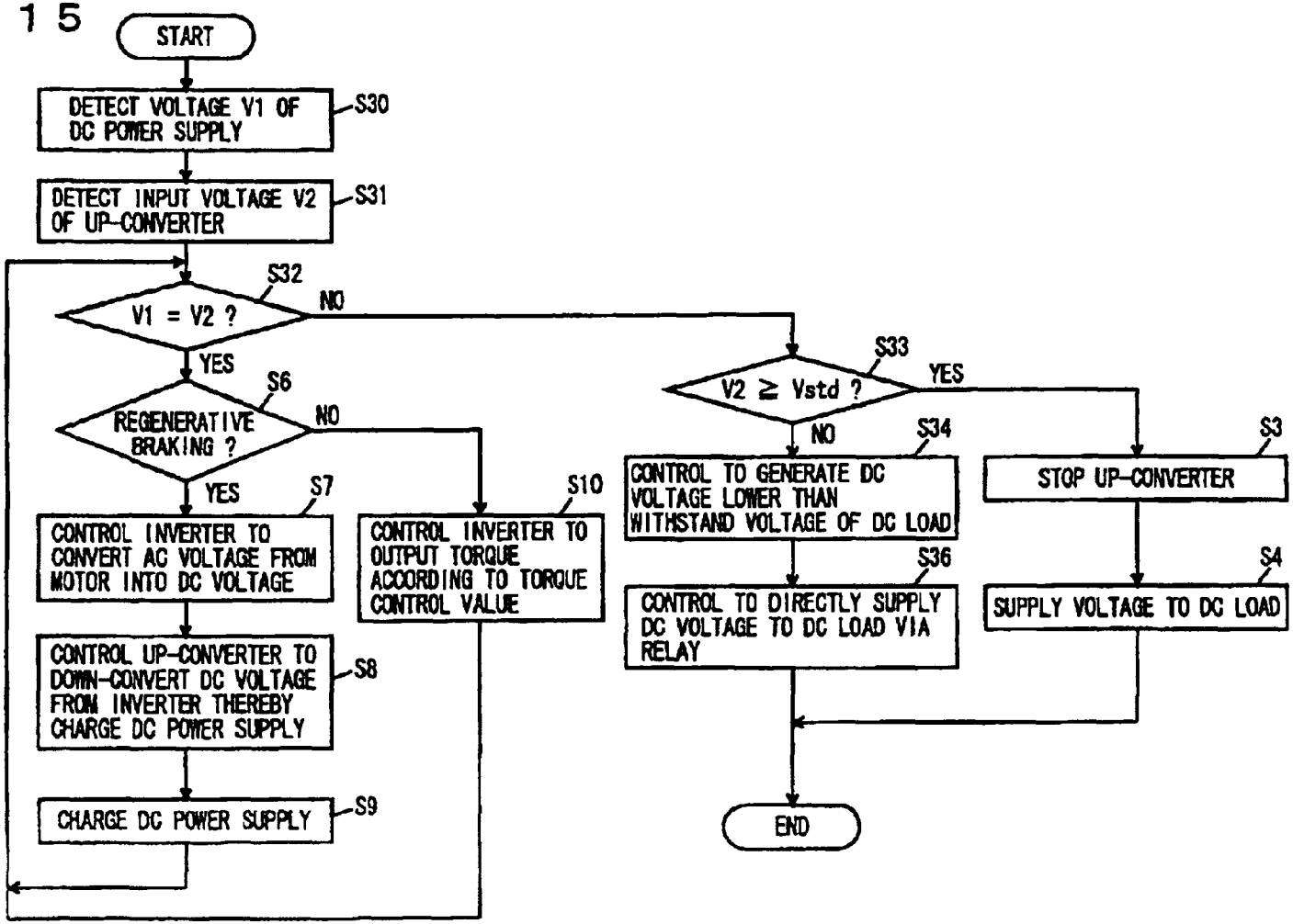
FIG. 15 is a flowchart illustrating another operation of the motor driver shown in FIG. 13.
Figure 16:
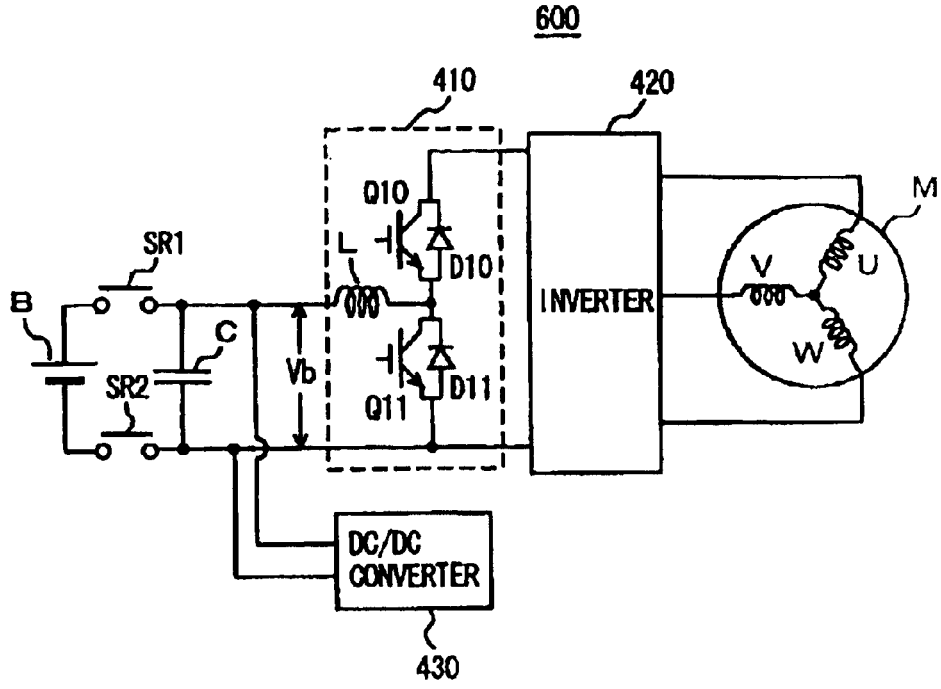
FIG. 16 PRIOR ART
FIG. 16 is a block diagram schematically showing a conventional motor driver.
Figure 17:
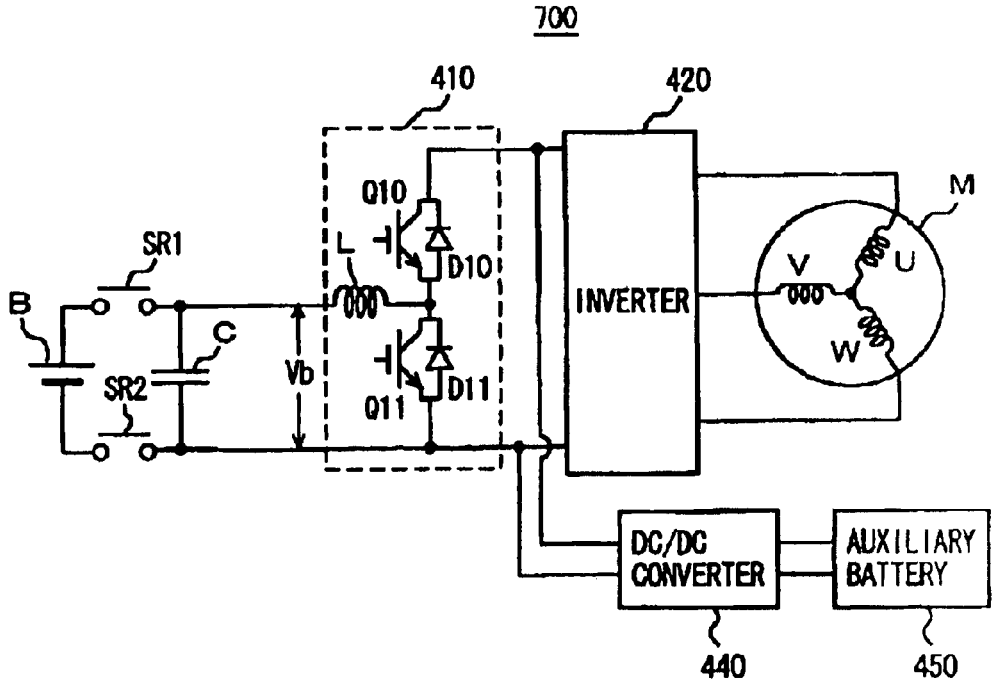
FIG. 17 PRIOR ART
FIG. 17 is a block digram schematically showing another conventional motor driver.

Motor driver 500 may operate following the flowchart shown in FIG. 15. The flowchart in FIG. 15 is the same as that in FIG. 12 except that step S35 in the flowchart of FIG. 12 is replaced with step S36 in FIG. 15.

Referring to FIG. 15, after step S34, step S36 as described above is carried out. Other details are described above.

According to the fourth embodiment as described above, when voltage V1 does not match voltage V2, which means that DC power supply B is separated, the voltage generated based on the torque of engine 35 and converted into the DC voltage is supplied directly to DC/DC converter 19 via system relay SR3.

The voltage generated by motor M2 and converted by inverter 31 into the DC voltage is supplied to DC/DC converter 19 via system relay SR3, so that the power generated by motor M2 can be supplied to DC/DC converter 19 even if NPN transistor Q1 of up-converter 12 fails.

Voltage sensors 10, 11 and 18, up-converter 12, inverters 14 and 31, DC/DC converter 19, system relay SR3, diodes D9 and D10 and control unit 300B constitute "load driver."

Diode D10 constitutes "supply unit" which directly supplies, to the DC load (DC/DC converter 19), a DC voltage produced from the power generated by motor M2 and having a voltage level lower than a predetermined value (voltage of at least the withstand voltage of DC/DC converter 19).

System relay SR3 constitutes "switching unit" switching supply of a DC voltage between a voltage converter (up-converter 12) and a supply unit (diode D10).

A control method according to the present invention for safely driving a DC load follows the flowchart shown in FIG. 14 or 15.

Moreover, the control by control unit 300B for safely driving the DC load is actually carried out by a CPU (Central Processing Unit). CPU reads, from a ROM (Read-Only Memory), a program including the steps shown in the flowchart in FIG. 14 or 15, and then executes the program read from the ROM to control driving of the DC load according to the flowchart shown in FIG. 14 or 15. The ROM thus corresponds to a computer (CPU)-readable recording medium on which a program is recorded that includes the steps of the flowchart shown in FIG. 14 or 15.

Other details are the same as those of the second and third embodiments.

According to the fourth embodiment, the load driver has the control unit and, under the control of the control unit, the power generated based on the torque of the engine is converted into the DC voltage lower than the withstand voltage of the DC load and the resultant DC voltage is supplied directly to the DC load, when the DC power supply is separated. The load driver further has the switching unit for switching supply of voltage generated by engine and converted into a DC voltage. Accordingly, even if the up-converter fails, the electric power generated according to torque of the engine can surely be supplied to the DC load connected between the DC power supply and the up-converter.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A load driver comprising:

a DC power supply outputting a DC voltage;

a voltage converter connected to said DC power supply to provide, toward said DC power supply, a DC voltage based on electric power generated by a power-generating unit;

a DC load connected [to] *in parallel with* said voltage converter and said DC power supply; [and]

["a] *a* control unit executing both of a first control and a second control, and one of the first control only and the second control only when [a . . . " voltage converter,] *a malfunction is detected in an electrical system between said DC power supply and said voltage converter* said first control being executed to protect an electrical system of said DC load and said second control being executed to continue operation of said DC load.

[2. The load driver according to claim 1, wherein said control unit executes said first control when said malfunction is detected.]

3. The load driver according to [claim 2,] *claim 1,* wherein when said malfunction is detected, said control unit controls said voltage converter to apply a voltage smaller than a predetermined value to the electrical system of said DC load.

4. The load driver according to claim 3, further comprising a voltage sensor detecting a voltage applied to said DC load, wherein said control unit stops operation of said voltage converter when the voltage detected by said voltage sensor reaches at least said predetermined value.

5. The load driver according to claim 4, wherein said power-generating unit is formed of at least one generator.

6. The load driver according to claim 5, wherein

[each of] said at least one [generators] *generator* is an AC generator, said load driver further comprises at least one [inverters] *inverter* provided correspondingly to said at least one [generators] *generator* and each converting an AC voltage supplied from the corresponding AC generator into a DC voltage, and said control unit controls [each of] said at least one [inverters] *inverter* in a normal operation to convert said AC voltage into said DC voltage and supply said DC voltage converted from said AC voltage to said voltage converter.

7. The load driver according to claim 4, wherein said generator is a drive motor generating drive power for a vehicle.

8. A load driver comprising:

a DC power supply outputting a DC voltage;

a voltage converter connected to said DC power supply to provide, toward said DC power supply, a DC voltage based on electric power generated by a power-generating unit;

a DC load connected to said voltage converter and said DC power supply;

a control unit executing at least one of first control and second control when a malfunction is detected in an electrical system between said DC power supply and said voltage converter, said first control being executed to protect an electrical system of said DC load and said second control being executed to continue operation of said DC load, wherein said control unit executes said first control when said malfunction is detected, and wherein when said malfunction is detected, said control unit controls said voltage converter to apply a voltage smaller than a predetermined value to the electrical system of said DC load; and a voltage sensor detecting [a] *the* DC voltage on an input of said voltage converter when a DC current is supplied from said DC power supply to said voltage converter, and said control unit stops operation of said voltage converter when the DC voltage detected by said voltage sensor reaches at least said predetermined value.

9. The load driver according to claim 8, wherein said power-generating unit is formed of at least one generator.

10. The load driver according to claim 9, wherein

[each of] said at least one [generators] *generator* is an AC generator, said load driver further comprises at least one [inverters] *inverter* provided correspondingly to said at least one [generators] *generator* and each converting an AC voltage supplied from the corresponding AC generator into a DC voltage, and said control unit controls [each of] said at least one [inverters] *inverter* in a normal operation to convert said AC voltage into said DC voltage and supply said DC voltage converted from said AC voltage to said voltage converter.

11. A load driver comprising:

a DC power supply outputting a DC voltage;

a voltage converter connected to said DC vower supply to provide, toward said DC power supply, a DC voltage based on electric sower generated by a power-generating unit;

a DC load connected to said voltage converter and said DC power supply;

a control unit executing at least one of first control and second control when a malfunction is detected in an electrical system between said DC power supply and said voltage converter, said first control being executed to protect an electrical system of said DC load and said second control being executed to continue operation of said DC load, wherein said control unit executes said first control when said malfunction is detected, and wherein when said malfunction is detected, said control unit controls said voltage converter to apply a voltage smaller than a predetermined value to the electrical system of said DC load;

a first voltage sensor detecting a first DC voltage output from said DC power supply; and a second voltage sensor detecting a second DC voltage on an input of said voltage converter when a DC current is supplied from said DC power supply to said voltage converter, wherein said control unit stops operation of said voltage converter when the first voltage detected by said first voltage sensor differs from the second voltage detected by said second voltage sensor.

12. The load driver according to claim 11, wherein said power-generating unit is formed of at least one generator.

13. The load driver according to claim 12, wherein said generator is an AC generator, said load driver further comprises an inverter converting an AC voltage supplied from said AC generator into a DC voltage, and said control unit controls said inverter in a normal operation to convert said AC voltage into said DC voltage and supply said DC voltage converted from said AC voltage to said voltage converter.

14. The load driver according to claim 11, wherein said power-generating unit is formed of a plurality of generators.

15. The load driver according to claim 14, wherein said control unit further controls a plurality of drivers corresponding respectively to said plurality of generators to keep a balance between supply and consumption of electric energy with respect to said plurality of generators, and controls the electrical system of said DC load to drive said DC load by electric power supplied from said DC power supply.

16. The load driver according to claim 14, wherein each of said plurality of generators [are] *is* an AC generator, said load driver further comprises a plurality of inverters provided correspondingly to said plurality of generators and each converting an AC voltage supplied from a corresponding AC generator into a DC voltage, and said control unit controls each of said plurality of inverters in a normal operation to convert said AC voltage into said DC voltage and supply said DC voltage converted from said AC voltage to said voltage converter.

17. A load driver comprising:

a DC power supply outputting a DC voltage;

a voltage converter connected to said DC power supply to provide, toward said DC power supply, a DC voltage based on electric power generated by a power-generating unit;

a DC load connected to said voltage converter and said DC power supply; and a control unit executing at least one of first control and second control when a malfunction is detected in an electrical system between said DC power supply and said voltage converter, said first control being executed to protect an electrical system of said DC load and said second control being executed to continue operation of said DC load;

a first voltage sensor detecting a first DC voltage output from said DC power supply; and a second voltage sensor detecting a second DC voltage on an input of said voltage converter when a DC current is supplied from said DC power supply to said voltage converter, wherein said control unit executes said second control when the first voltage detected by said first voltage sensor differs from the second voltage detected by said second voltage sensor.

18. The load driver according to claim 17, wherein said control unit executes control for supplying the DC voltage based on electric power generated by said power-generating unit to said DC load.

19. The load driver according to claim 18, wherein said control unit controls said voltage converter for directly supplying to said DC load a DC voltage based on the electric power generated by said power-generating unit and having a voltage level lower than a predetermined value.

20. The load driver according to claim 19, wherein said voltage converter includes first and second switching elements connected in series between terminals receiving said DC voltage, switching of at least one of said switching elements being controlled in voltage-up-converting operation and voltage-down-converting operation and a reactor having one end connected to a point of connection between said first switching element and said second switching element, said reactor and said second switching element are connected in series between terminals of said DC power supply, and said control unit keeps said first switching element continuously in a conducting state and keeps said second switching element continuously in a disconnected state.

21. The load driver according to claim 18, further comprising:

a supply unit directly supplying to said DC load [a] *the* DC voltage based on the electric power generated by said power-generating unit and having a voltage level lower than a predetermined value; and a switching unit switching supply of said DC voltage between said voltage converter and said supply unit, wherein said control unit controls said switching unit to supply said DC voltage to said supply unit.

22. A control method for safely driving a DC load connected to a DC power supply, comprising:

a first step of detecting a malfunction in an electrical system between said DC power supply and a voltage converter converting voltage; [and]

["a] *a* second step of executing both of a first control and a second control, and one of the first control only and the second control only [. . . "] *when said malfunction is detected, said first control being executed to protect an electrical system* of said DC load connected [to said] *in parallel with said* voltage converter and *with* said DC power supply and said second control being executed to continue operation of said DC load.

23. The control method according to claim 22, wherein said first control is executed in said second step.

24. The control method according to claim 23, wherein said first step includes a first sub step of detecting a voltage applied to said DC load and a second sub step of detecting whether or not said detected voltage is equal to or more than a predetermined value, and in said second step, operation of said voltage converter is stopped when said detected voltage is equal to or more than said predetermined value.

25. A control method for safely driving a DC load connected to a DC power supply, comprising:

a first step of detecting a malfunction in an electrical system between said DC power supply and a voltage converter converting voltage; and a second step of executing at least one of first control and second control when said malfunction is detected, said first control being executed to protect an electrical system of said DC load connected to said voltage converter and said DC power supply and said second control being executed to continue operation of said DC load, wherein said first control is executed in said second step, and wherein said first step includes a first sub step of detecting a DC voltage on an input of said voltage converter when a DC current is supplied from said DC power supply to said voltage converter and a second sub step of detecting whether or not said detected voltage is equal to or more than a predetermined value, and in said second step, operation of said voltage converter is stopped when said detected voltage is equal to or more than said predetermined value.

26. A control method for safely driving a DC load connected to a DC power supply, comprising:

a first step of detecting a malfunction in an electrical system between said DC power supply and a voltage converter converting voltage; and a second step of executing at least one of first control and second control when said malfunction is detected, said first control being executed to protect an electrical system of said DC load connected to said voltage converter and said DC power supply and said second control being executed to continue operation of said DC load, wherein said first control is executed in said second step, and wherein said first step includes a first sub step of detecting a first voltage output from said DC power supply, a second sub step of detecting a second DC voltage on an input of said voltage converter when a DC current is supplied from said DC power supply to said voltage converter and a third sub step of detecting whether or not said first voltage detected in said first sub step matches said second voltage detected in said second sub step, and in said second step, operation of said voltage converter is stopped when said first voltage does not match said second voltage.

27. The control method according to claim 26, wherein said voltage converter is connected to a plurality of inverters provided correspondingly to a plurality of power-generating units, and said control method further comprises:

a third step of controlling said plurality of inverters to maintain a balance between supply and consumption of electric energy with respect to said plurality of power-generating units; and a fourth step of controlling the electrical system of said DC load to drive said DC load by electric power supplied from said DC power supply.

28. A control method for safely driving a DC load connected to a DC power supply, comprising:

a first step of detecting a malfunction in an electrical system between said DC power supply and a voltage converter converting voltage; and a second step of executing at least one of first control and second control when said malfunction is detected, said first control being executed to protect an electrical system of said DC load connected to said voltage converter and said DC power supply and said second control being executed to continue operation of said DC load, wherein said first step includes a first sub step of detecting a first voltage output from said DC power supply, a second sub step of detecting a second DC voltage on an input of said voltage converter when a DC current is supplied from said DC power supply to said voltage converter and a third sub step of detecting whether or not said first voltage detected in said first sub step matches said second voltage detected in said second sub step, and in said second step, said second control is executed when said first voltage does not match said second voltage.

29. The control method according to claim 28, wherein in said second step, control is executed to supply, to said DC load, DC power based on electric power generated by a power-generating unit.

30. The control method according to claim 29, wherein in said second step, said voltage converter is controlled to directly supply, to said DC load, a DC voltage based on the electric power generated by said power-generating unit and having a voltage level lower than a predetermined value.

31. The control method according to claim 30, wherein said voltage converter includes first and second switching elements connected in series between terminals receiving said DC voltage, switching of at least one of said switching elements being controlled in voltage-up-converting operation and voltage-down-converting operation and a reactor having one end connected to a point of connection between said first switching element and said second switching element, said reactor and said second switching element are connected in series between terminals of said DC power supply, and said second step of said control method includes a fourth sub step of keeping said first switching element continuously in a conducting state and a fifth sub step of keeping said second switching element continuously in a disconnected state.

32. The control method according to claim 29, wherein said DC load is connected to a supply unit and said voltage converter, said supply unit supplying, toward said DC power supply, a DC voltage based on the electric power generated by said power-generating unit, said supply unit and said voltage converter are connected to a switching unit switching supply of said DC voltage between said supply unit and said voltage converter, and in said second step of said control method, said switching unit is controlled to supply, to said supply unit, [a] *the* DC voltage based on the electric power generated by said power-generating unit and having a voltage level lower than a predetermined value.

33. A computer-readable recording medium having a program recorded thereon to allow a computer to execute control for safely driving a DC load connected to a DC power supply, said computer executing:

a first step of detecting a malfunction in an electrical system between said DC power supply and a voltage converter converting voltage; and

[“a] *a* second step of executing both of a first control and a second control, and one of the first control only and the second control only [. . . ”] *when a malfunction is detected, said first control being executed to protect an electrical system* of said DC load connected [to] *in parallel with* said voltage converter and *with* said DC power supply and said second control being executed to continue operation of said DC load.

34. The computer-readable recording medium according to claim 33, wherein said first control is executed in said second step.

35. The computer-readable recording medium according to claim 34, wherein said first step includes a first sub step of detecting a voltage applied to said DC load and a second sub step of detecting whether or not said detected voltage is equal to or more than a predetermined value, and in said second step, operation of said voltage converter is stopped when said detected voltage is equal to or more than said predetermined value.

36. A computer-readable recording medium having a program recorded thereon to allow a computer to execute control for safely driving a DC load connected to a DC power supply, said computer executing:

a first step of detecting a malfunction in an electrical system between said DC power supply and a voltage converter converting voltage; and a second step of executing at least one of first control and second control when said malfunction is detected, said first control being executed to protect an electrical system of said DC load connected to said voltage converter and said DC power supply and said second control being executed to continue operation of said DC load, wherein said first control is executed in said second step, wherein said first step includes a first sub step of detecting a DC voltage on an input of said voltage converter when a DC current is supplied from said DC power supply to said voltage converter and a second sub step of detecting whether or not said detected voltage is equal to or more than a predetermined value, and in said second step, operation of said voltage converter is stopped when said detected voltage is equal to or more than said predetermined value.

37. A computer-readable recording medium having a program recorded thereon to allow a computer to execute control for safely driving a DC load connected to a DC power supply, said computer executing:

a first step of detecting a malfunction in an electrical system between said DC power supply and a voltage converter converting voltage; and a second step of executing at least one of first control and second control when said malfunction is detected, said first control being executed to protect an electrical system of said DC load connected to said voltage converter and said DC power supply and said second control being executed to continue operation of said DC load, wherein said first control is executed in said second step, wherein said first step includes a first sub step of detecting a first voltage output from said DC power supply, a second sub step of detecting a second DC voltage on an input of said voltage converter when a DC current is supplied from said DC power supply to said voltage converter and a third sub step of detecting whether or not said first voltage detected in said first sub step matches said second voltage detected in said second sub step, and in said second step, operation of said voltage converter is stopped when said first voltage does not match said second voltage.

38. The computer-readable recording medium according to claim 37, wherein said voltage converter is connected to a plurality of inverters provided correspondingly to a plurality of power-generating units, and said program allows said computer to further execute:

a third step of controlling said plurality of inverters to maintain a balance between supply and consumption of electric energy with respect to said plurality of power-generating units; and a fourth step of controlling the electrical system of said DC load to drive said DC load by electric power supplied from said DC power supply.

39. A computer-readable recording medium having a program recorded thereon to allow a computer to execute control for safely driving a DC load connected to a DC power supply, said computer executing:

a first step of detecting a malfunction in an electrical system between said DC power supply and a voltage converter converting voltage; and a second step of executing at least one of first control and second control when said malfunction is detected, said first control being executed to protect an electrical system of said DC load connected to said voltage converter and said DC power supply and said second control being executed to continue operation of said DC load, wherein said first step includes a first sub step of detecting a first voltage output from said DC power supply, a second sub step of detecting a second DC voltage on an input of said voltage converter when a DC current is supplied from said DC power supply to said voltage converter and a third sub step of detecting whether or not said first voltage detected in said first sub step matches said second voltage detected in said second sub step, and in said second step, said second control is executed when said first voltage does not match said second voltage.

40. The computer-readable recording medium according to claim 39, wherein in said second step, control is executed to supply, to said DC load, DC power based on electric power generated by a power-generating unit.

41. The computer-readable recording medium according to claim 40, wherein in said second step, said voltage converter is controlled to directly supply, to said DC load, a DC voltage based on the electric power generated by said power-generating unit and having a voltage level lower than a predetermined value.

42. The computer-readable recording medium according to claim 41, wherein said voltage converter includes first and second switching elements connected in series between terminals receiving said DC voltage, switching of at least one of said switching elements being controlled in voltage-up-converting operation and voltage-down-converting operation and a reactor having one end connected to a point of connection between said first switching element and said second switching element, said reactor and said second switching element are connected in series between terminals of said DC power supply, and said second step of said program includes a fourth sub step of keeping said first switching element continuously in a conducting state and a fifth sub step of keeping said second switching element continuously in a disconnected state.

43. The computer-readable medium according to claim 40, wherein said DC load is connected to a supply unit and said voltage converter, said supply unit supplying, toward said DC power supply, a DC voltage based on the electric power generated by said power-generating unit, said supply unit and said voltage converter are connected to a switching unit switching supply of said DC voltage between said supply unit and said voltage converter, and in said second step of said program, said switching unit is controlled to supply, to said supply unit, [a] *the* DC voltage based on the electric power generated by said power-generating unit and having a voltage level lower than a predetermined value.

*44. The load driver according to claim 4, wherein the predetermined value is determined according to a formula:*

$$\text{predetermined value}=V0+\alpha,$$

*where V0 is the DC voltage output from the DC power supply, and α is a value determined so that the sum of V0 and α is a voltage which is impossible to be output from the DC power supply.*

*45. The load driver according to claim 8, wherein the predetermined value is a voltage which is never output from the DC power supply.*

*46. The load driver according to claim 11, wherein the predetermined value is determined according to a formula:*

$$\text{predetermined value}=V0+\alpha,$$

*where V0 is the DC voltage output from the DC power supply, and α is a value determined so that the sum of V0 and α is a voltage which is impossible to be output from the DC power supply.*

*47. The load driver according to claim 21, wherein the predetermined value is a voltage which is never output from the DC power supply.*

*48. The control method according to claim 24, wherein the predetermined value is a voltage which is never output from the DC power supply.*

*49. The control method according to claim 25, wherein the predetermined value is determined according to a formula:*

$$\text{predetermined value}=V0+\alpha,$$

*where V0 is the DC voltage output from the DC power supply, and α is a value determined so that the sum of V0 and α is a voltage which is impossible to be output from the DC power supply.*

*50. The control method according to claim 30, wherein the predetermined value is a voltage which is never output from the DC power supply.*

*51. The computer-readable recording medium according to claim 35, wherein the predetermined value is a voltage which is never output from the DC power supply.*

*52. The computer-readable recording medium according to claim 36, wherein the predetermined value is determined according to a formula:*

$$\text{predetermined value}=V0+\alpha,$$

*where V0 is the DC voltage output from the DC power supply, and α is a value determined so that the sum of V0 and α is a voltage which is impossible to be output from the DC power supply.*

*53. The computer-readable recording medium according to claim 43, wherein the predetermined value is a voltage which is never output from the DC power supply.*

* * * * *